US010458564B2

(12) United States Patent
Enston

(10) Patent No.: US 10,458,564 B2
(45) Date of Patent: Oct. 29, 2019

(54) PIPELINE APPARATUS

(71) Applicant: Pipe Transformations Ltd., London (GB)

(72) Inventor: Robert Peter Enston, Metro Manilla (PH)

(73) Assignee: Pipe Transformations Ltd, London (GB)

( * ) Notice: Subject to any disclaimer, the term of this patent is extended or adjusted under 35 U.S.C. 154(b) by 0 days.

(21) Appl. No.: 15/871,469

(22) Filed: Jan. 15, 2018

(65) Prior Publication Data

US 2018/0224003 A1   Aug. 9, 2018

Related U.S. Application Data

(63) Continuation of application No. 14/419,437, filed as application No. PCT/GB2013/052082 on Aug. 5, 2013.

(30) Foreign Application Priority Data

Aug. 3, 2012   (GB) .................................. 1213808.7

(51) Int. Cl.
| F16K 27/04 | (2006.01) |
| F16K 3/02 | (2006.01) |
| F16K 3/316 | (2006.01) |
| E21B 34/00 | (2006.01) |

(52) U.S. Cl.
CPC ............ *F16K 27/044* (2013.01); *E21B 34/00* (2013.01); *F16K 3/0227* (2013.01); *F16K 3/0272* (2013.01); *F16K 3/0281* (2013.01); *F16K 3/316* (2013.01)

(58) Field of Classification Search
CPC .... F16K 3/0272; F16K 3/0227; F16K 3/0281; F16K 3/316; F16K 27/044; F16K 27/047; E21B 34/00
USPC ........ 137/454.2, 454.4–454.6; 251/328, 329, 251/360–363
See application file for complete search history.

(56) References Cited

U.S. PATENT DOCUMENTS

| 176,321 | A | * | 4/1876 | Kromer et al. ........... F16K 3/12 251/327 |
| 769,831 | A | * | 9/1904 | Ogden .................. F16K 3/0227 251/328 |
| 851,161 | A | * | 4/1907 | Churchill .................. F16K 3/08 137/316 |

(Continued)

FOREIGN PATENT DOCUMENTS

| DE | 34 28 636 A1 | 2/1986 |
| DE | 10 2008 024363 A1 | 12/2009 |

(Continued)

*Primary Examiner* — Kevin F Murphy
*Assistant Examiner* — Jonathan J Waddy
(74) *Attorney, Agent, or Firm* — Kimberly O Snead

(57) ABSTRACT

Pipeline apparatus comprises a housing including a riser and a pipeline connector and a seal pack assembly mounted in a member that is mounted in the riser, the apparatus including a shaft extending through the seal pack assembly. The seal pack assembly includes at least one seal situated and configured to provide a seal between the outer surface of the shaft and a component of the seal pack assembly through which the shaft extends, that component being releasably attached to the member.

6 Claims, 31 Drawing Sheets

(56) References Cited

U.S. PATENT DOCUMENTS

| | | | |
|---|---|---|---|
| 966,150 A * | 8/1910 | Woodbridge | F16K 3/186 137/544 |
| 1,092,421 A * | 4/1914 | Anderson | F16K 1/42 251/328 |
| 2,678,802 A * | 5/1954 | Adams | F16K 3/30 251/328 |
| 2,705,019 A * | 3/1955 | Volpin | F16K 27/044 137/315.3 |
| 3,060,964 A | 10/1962 | Bagwell | |
| 3,154,094 A * | 10/1964 | Bredtschneider | F16K 5/0636 137/315.19 |
| 3,658,087 A | 4/1972 | Nelson | |
| 3,768,774 A * | 10/1973 | Baugh | F16K 3/316 251/175 |
| 3,778,030 A * | 12/1973 | Carlin | F16K 3/12 251/327 |
| 4,246,928 A * | 1/1981 | Burns | F16K 3/16 137/315.32 |
| 4,313,458 A * | 2/1982 | Burns | F16K 3/16 251/327 |
| 4,460,012 A * | 7/1984 | Koumi | F16K 27/047 137/315.11 |
| 4,605,036 A * | 8/1986 | Smith | F16K 5/0435 137/327 |
| 4,699,359 A | 10/1987 | David | |
| 4,771,805 A | 9/1988 | Maa | |
| 4,854,545 A | 8/1989 | Pezzarossi | |
| 5,129,417 A * | 7/1992 | Dupont | F16K 5/202 137/315.26 |
| 5,135,019 A | 8/1992 | Dupont | |
| 5,211,686 A | 5/1993 | Karlsen | |
| 8,459,608 B2 * | 6/2013 | Lah | C10B 25/10 251/176 |
| 8,813,771 B2 * | 8/2014 | Rayment | F16K 3/30 137/15.23 |
| 8,939,432 B1 * | 1/2015 | Tan | F16K 3/186 251/197 |
| 8,973,897 B2 * | 3/2015 | Cordova | F16K 3/02 137/15.23 |
| 2013/0255802 A1 * | 10/2013 | Minnock | E21B 34/045 137/554 |
| 2013/0256570 A1 * | 10/2013 | McHugh | F16K 31/122 251/30.01 |

FOREIGN PATENT DOCUMENTS

| | | |
|---|---|---|
| EP | 0445020 A1 | 9/1991 |
| EP | 1 347 221 A1 | 9/2003 |
| WO | 00/34703 A1 | 6/2000 |
| WO | 2011/115553 A1 | 9/2011 |

\* cited by examiner

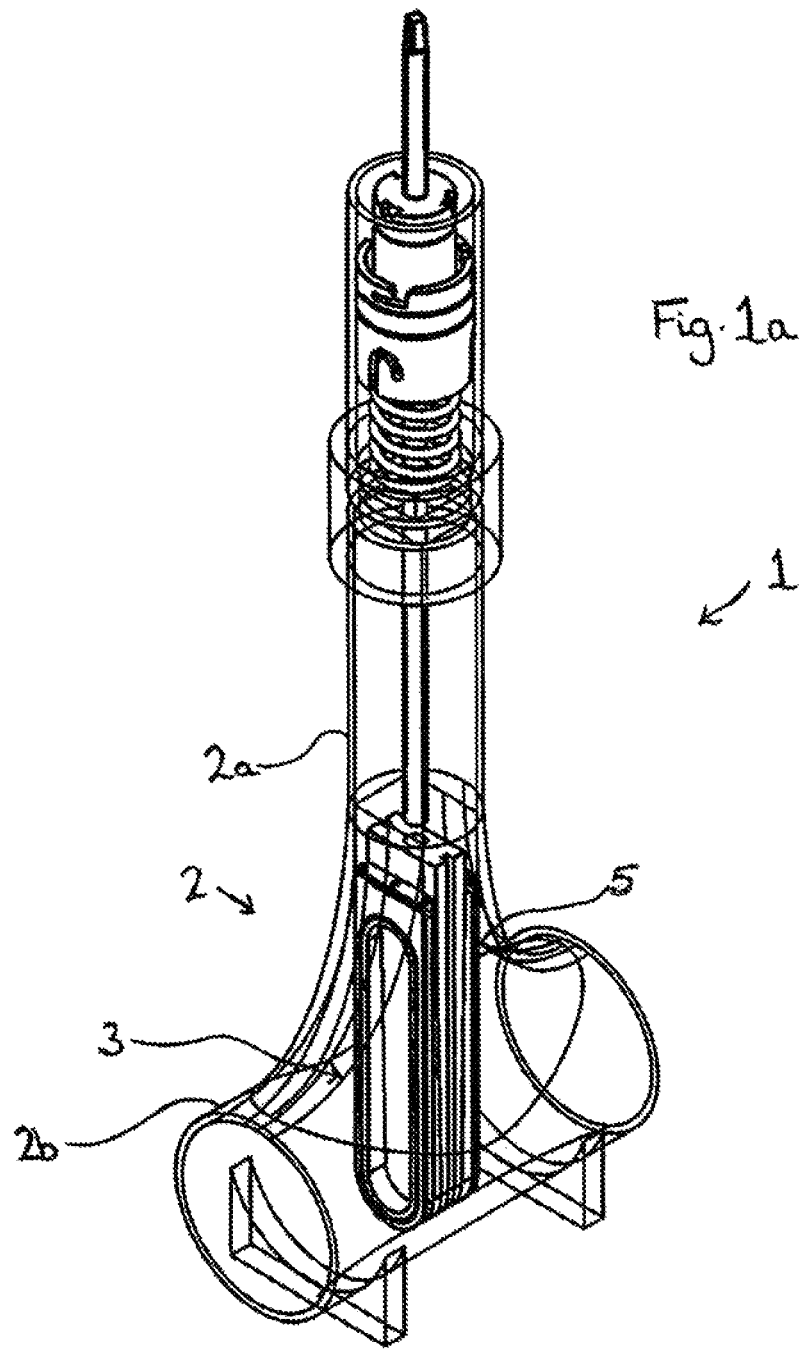

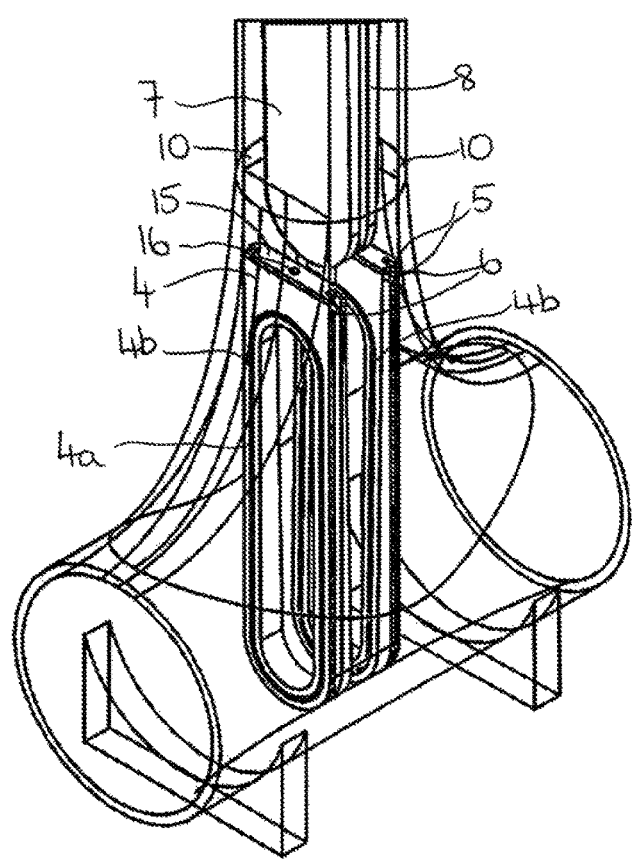

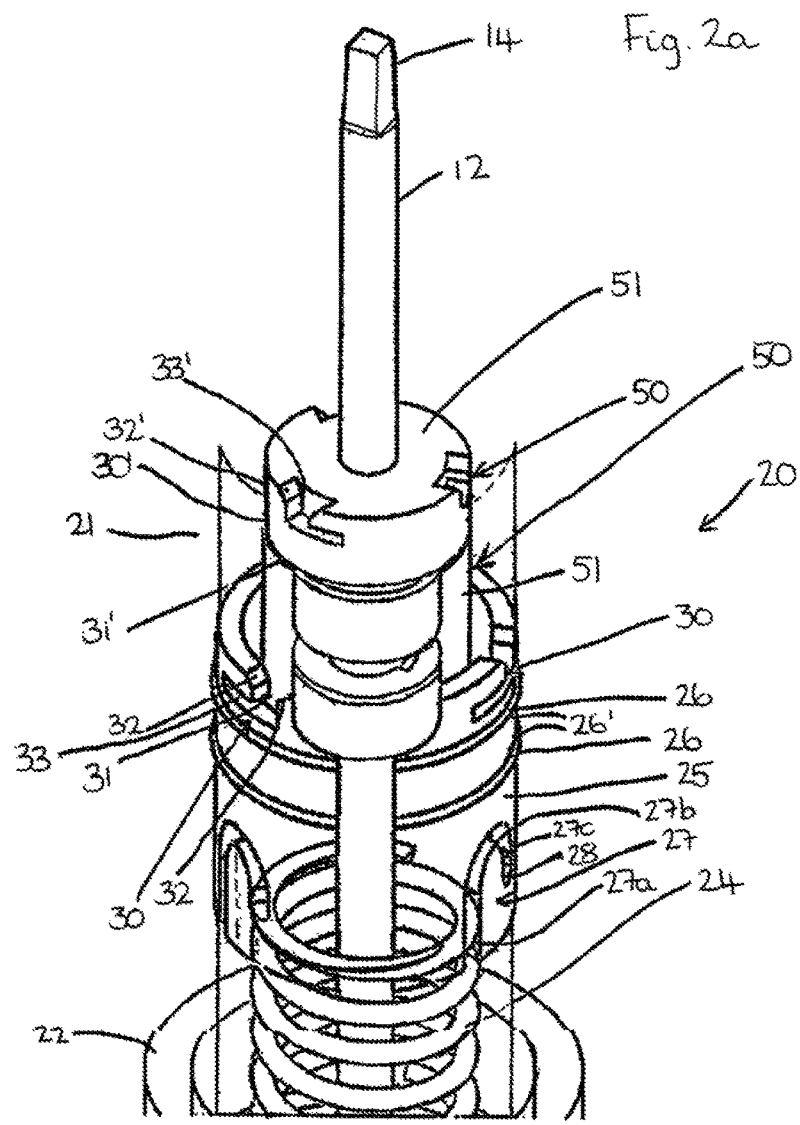

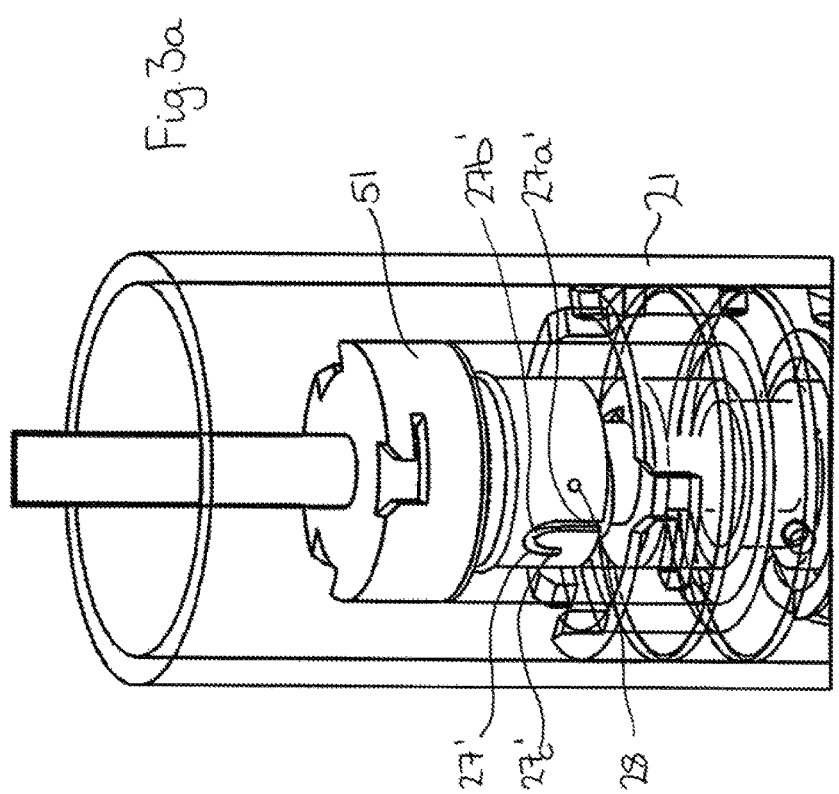

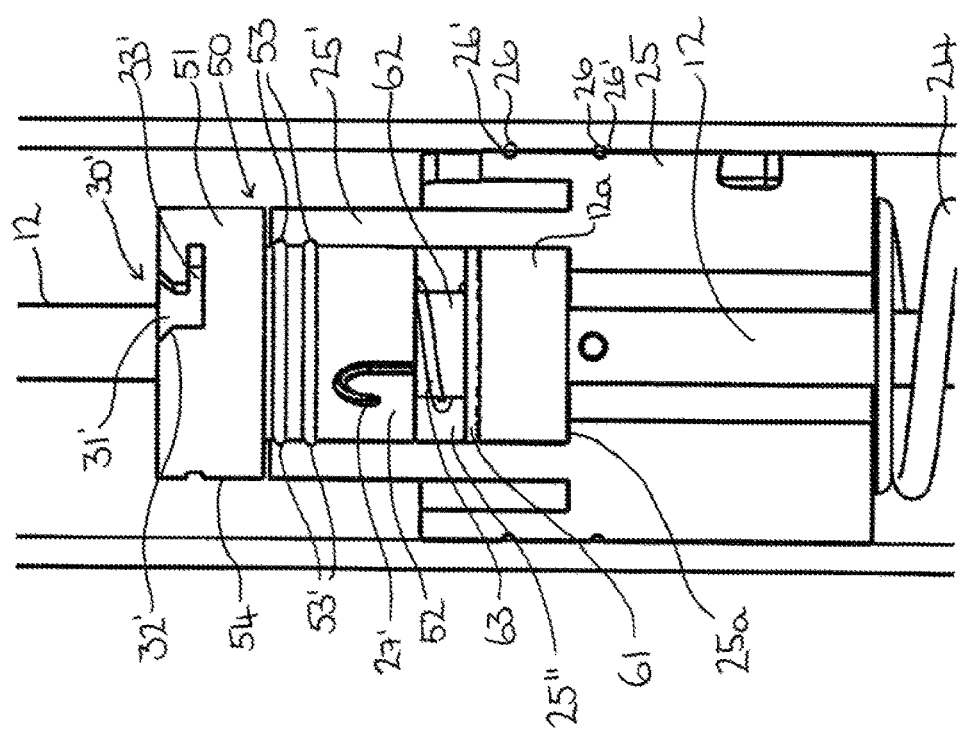

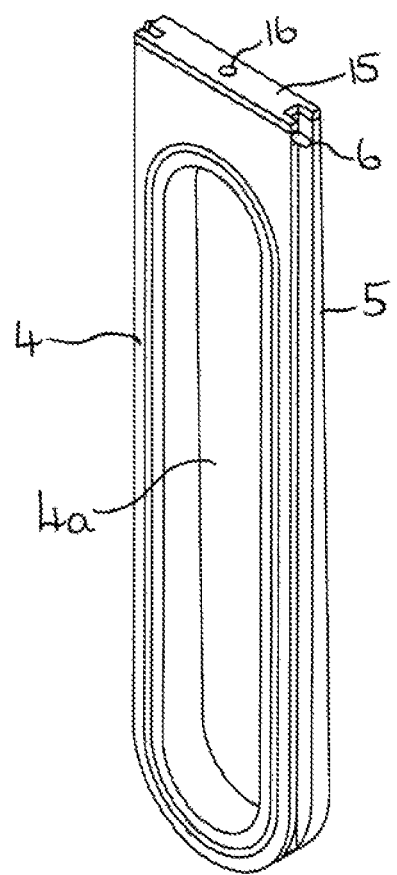

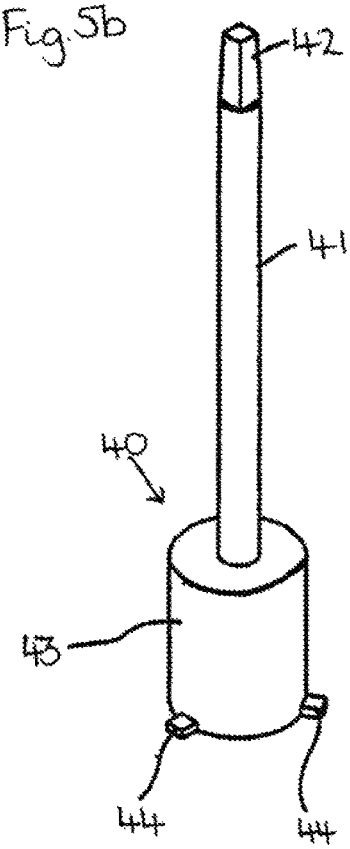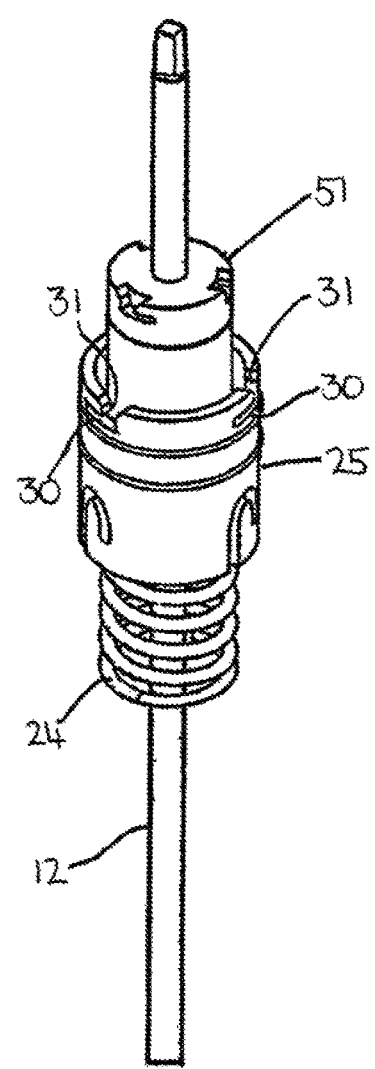

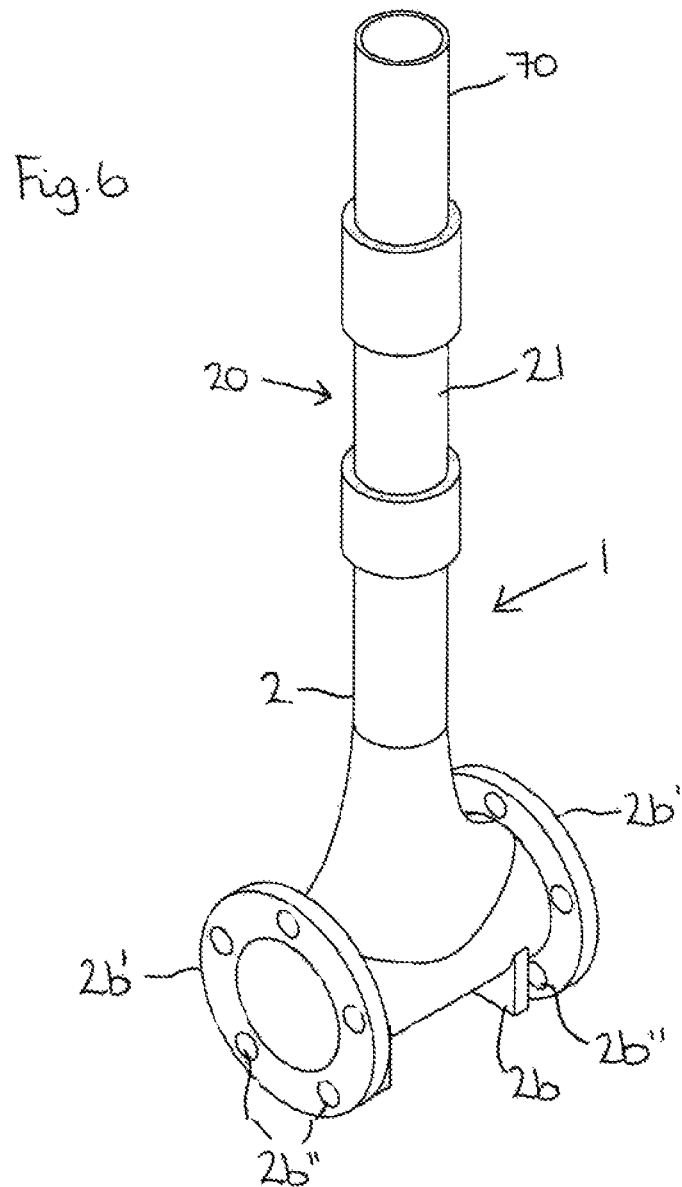

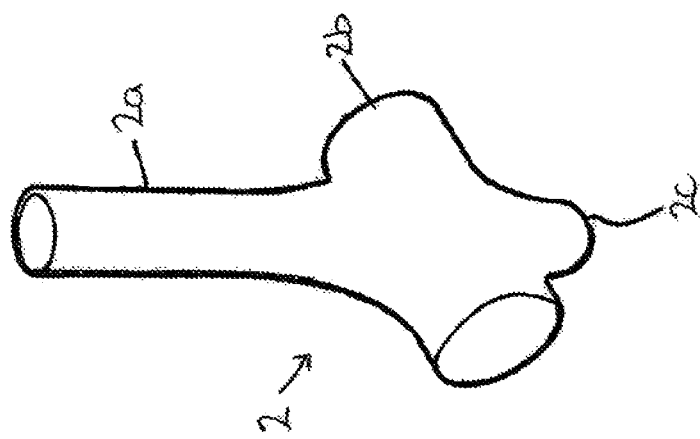

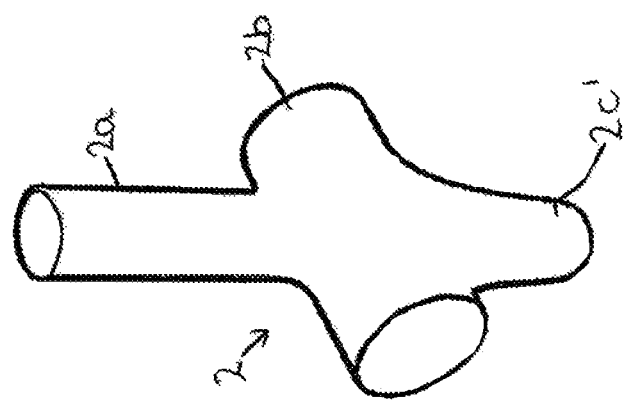

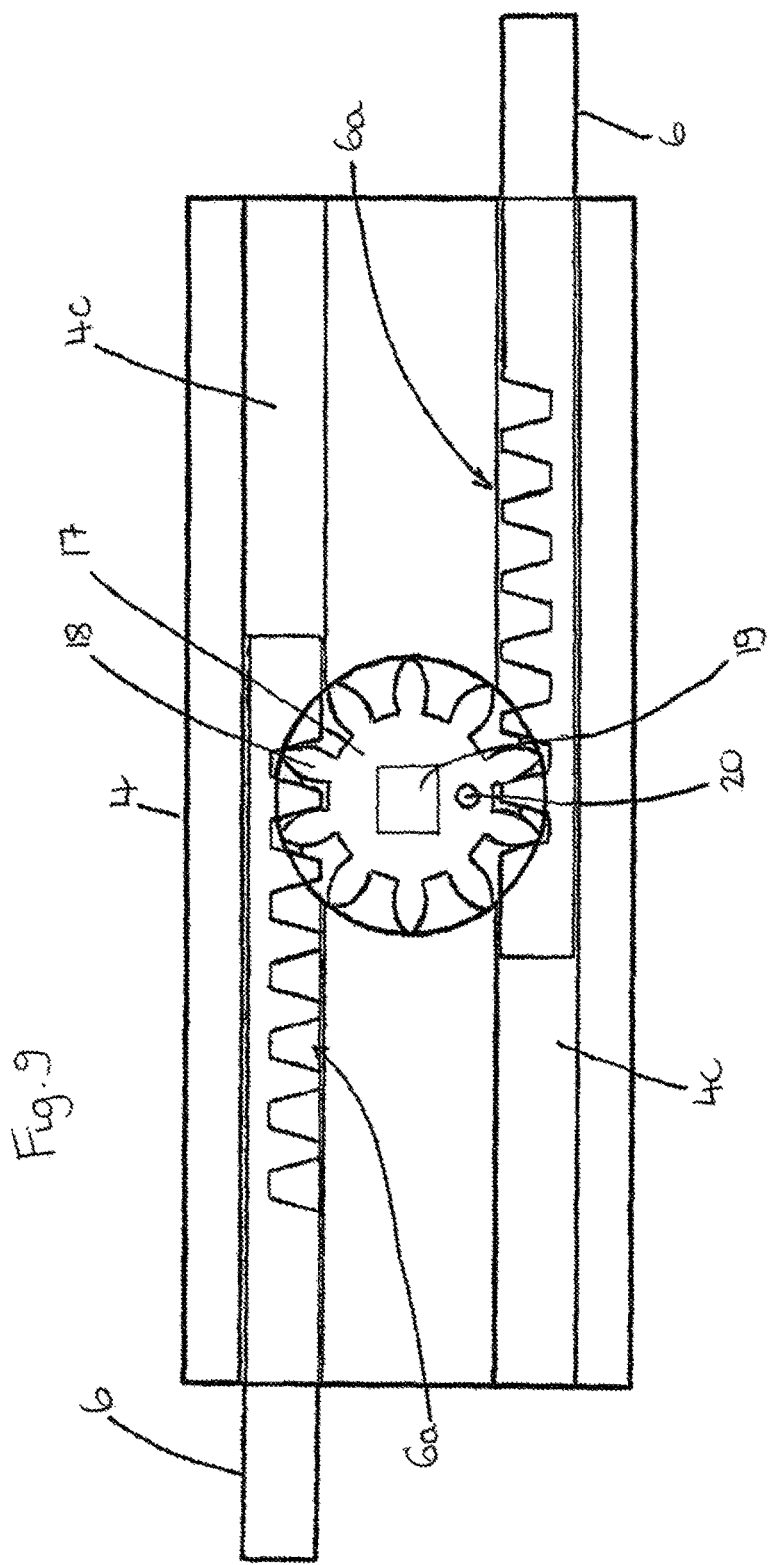

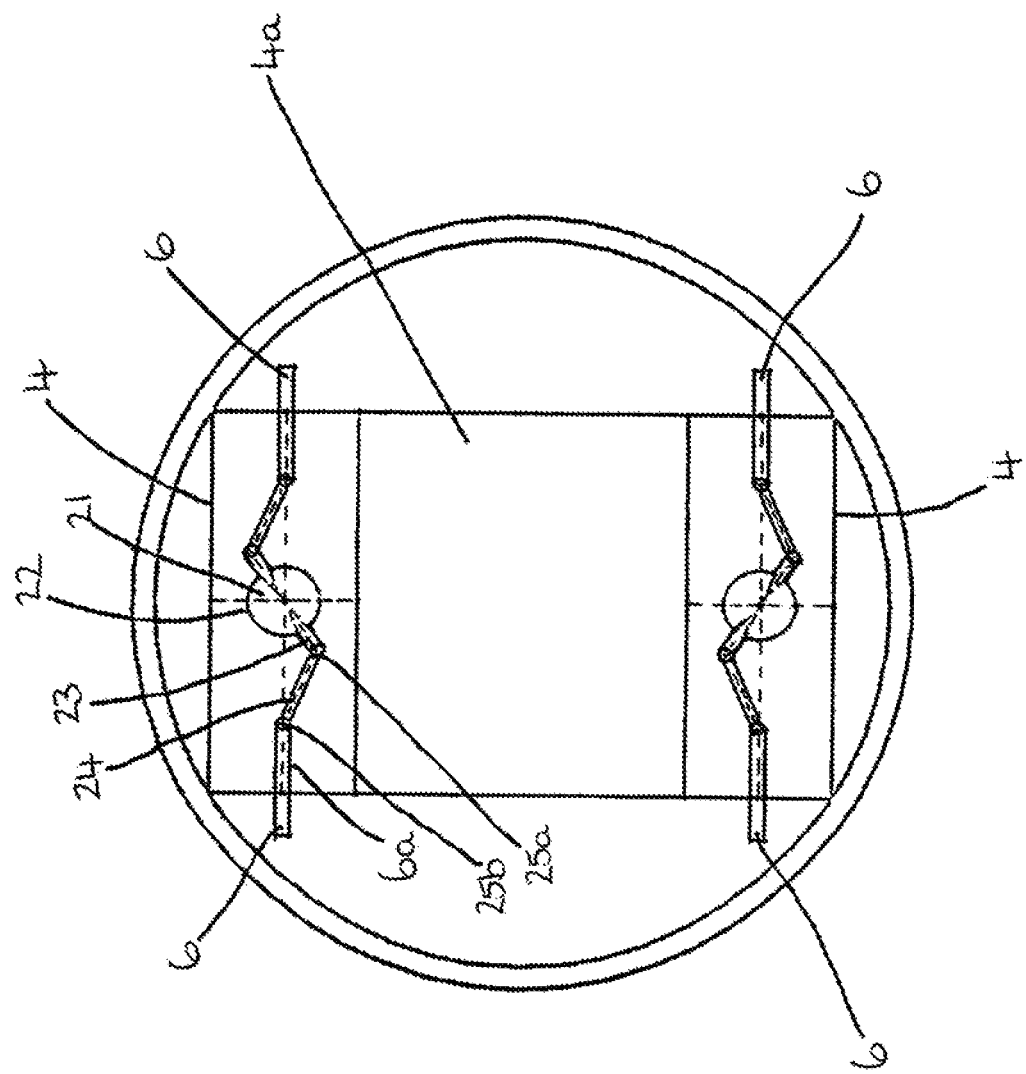

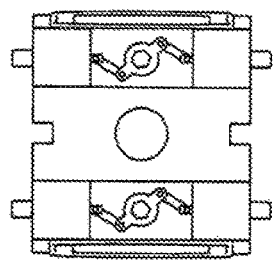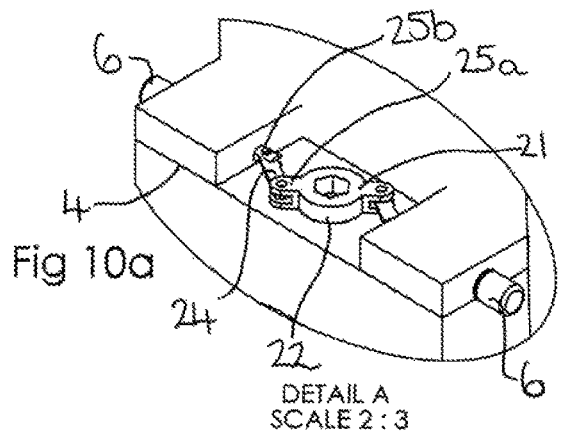
Fig 10a
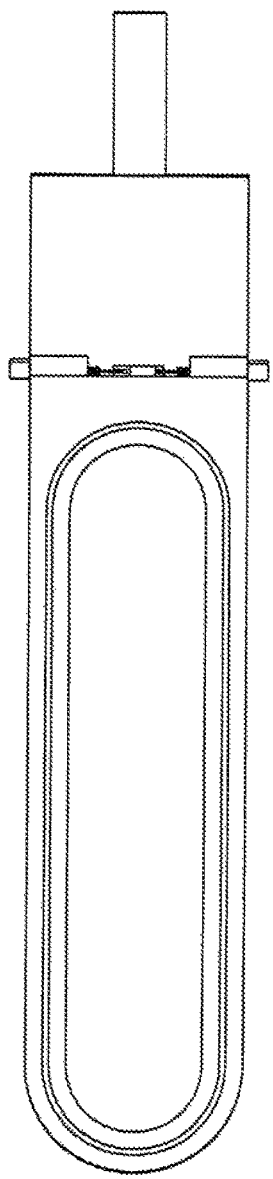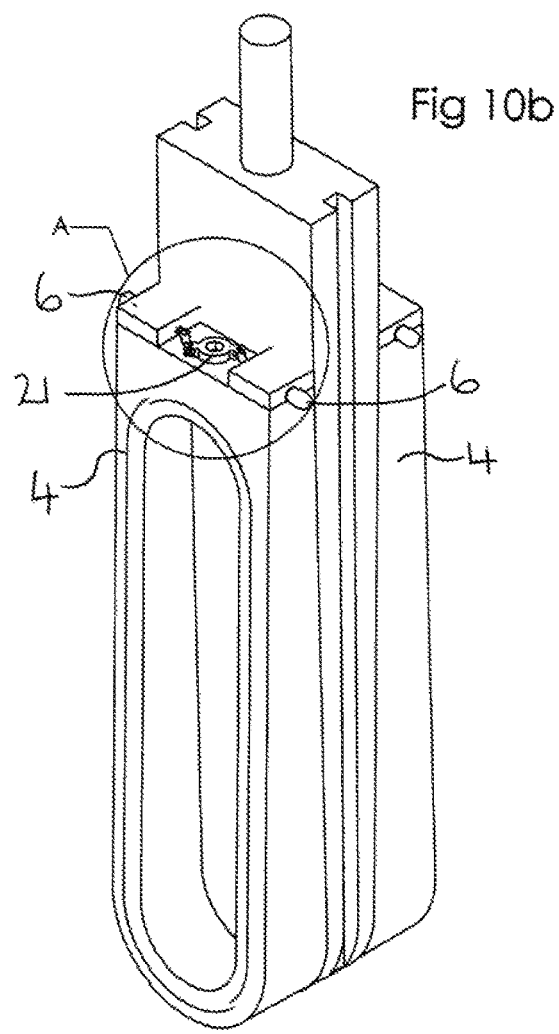
Fig 10b

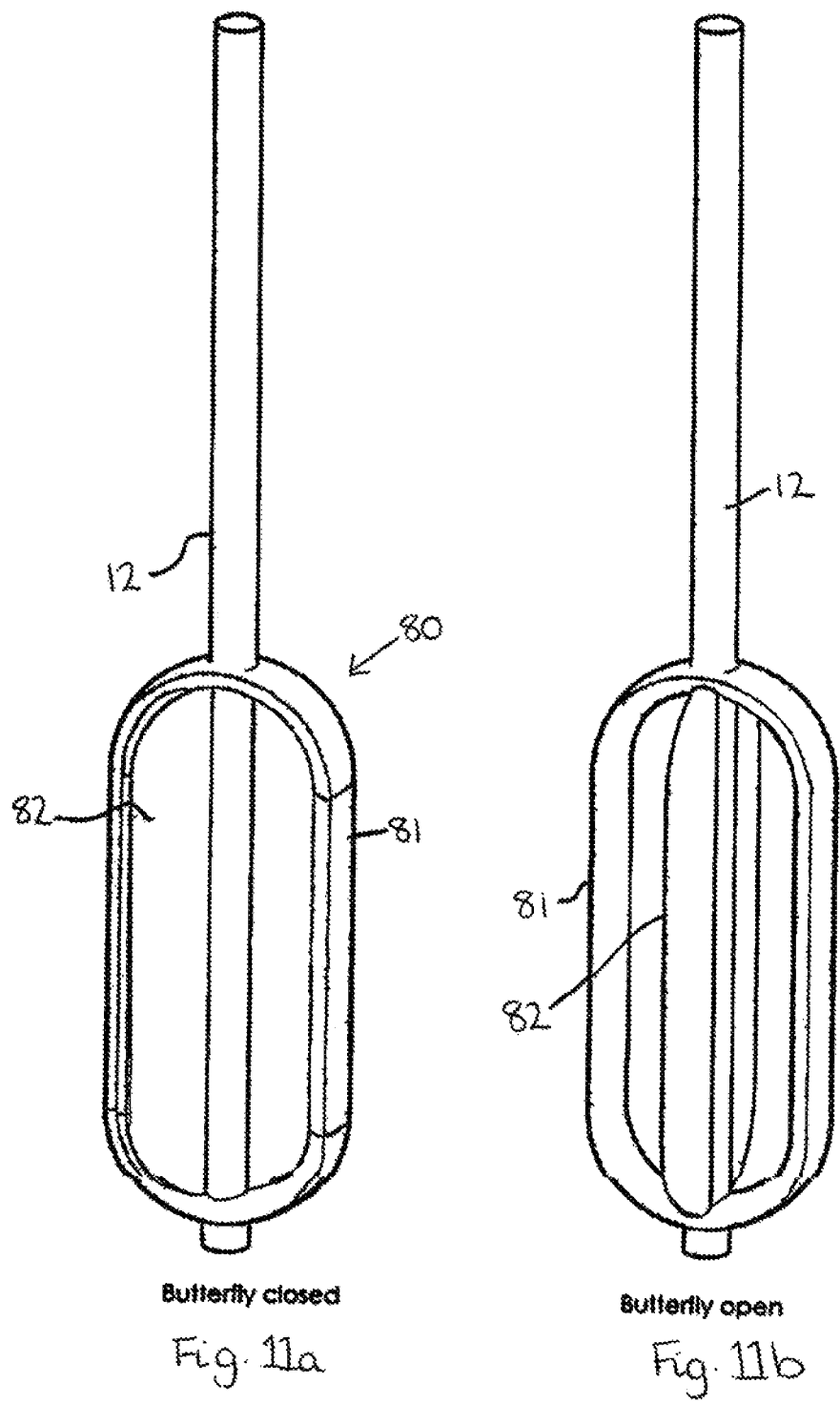

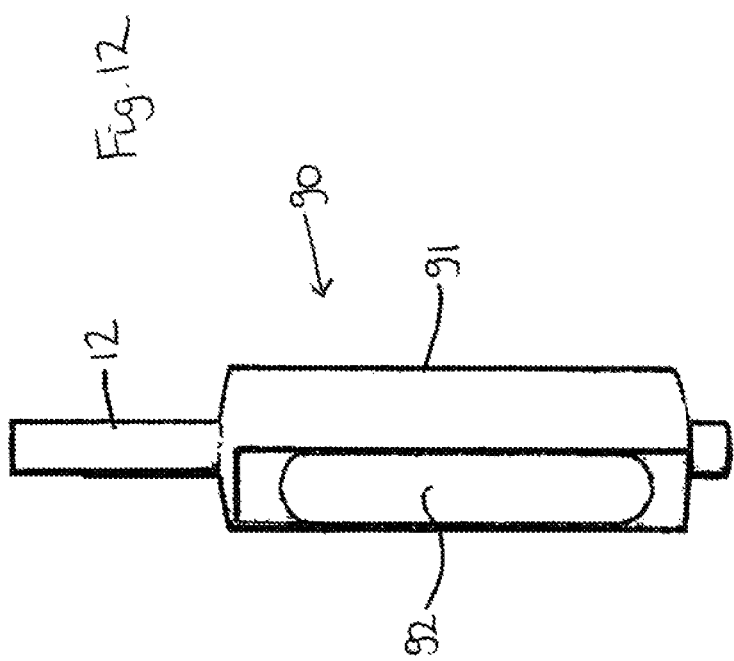

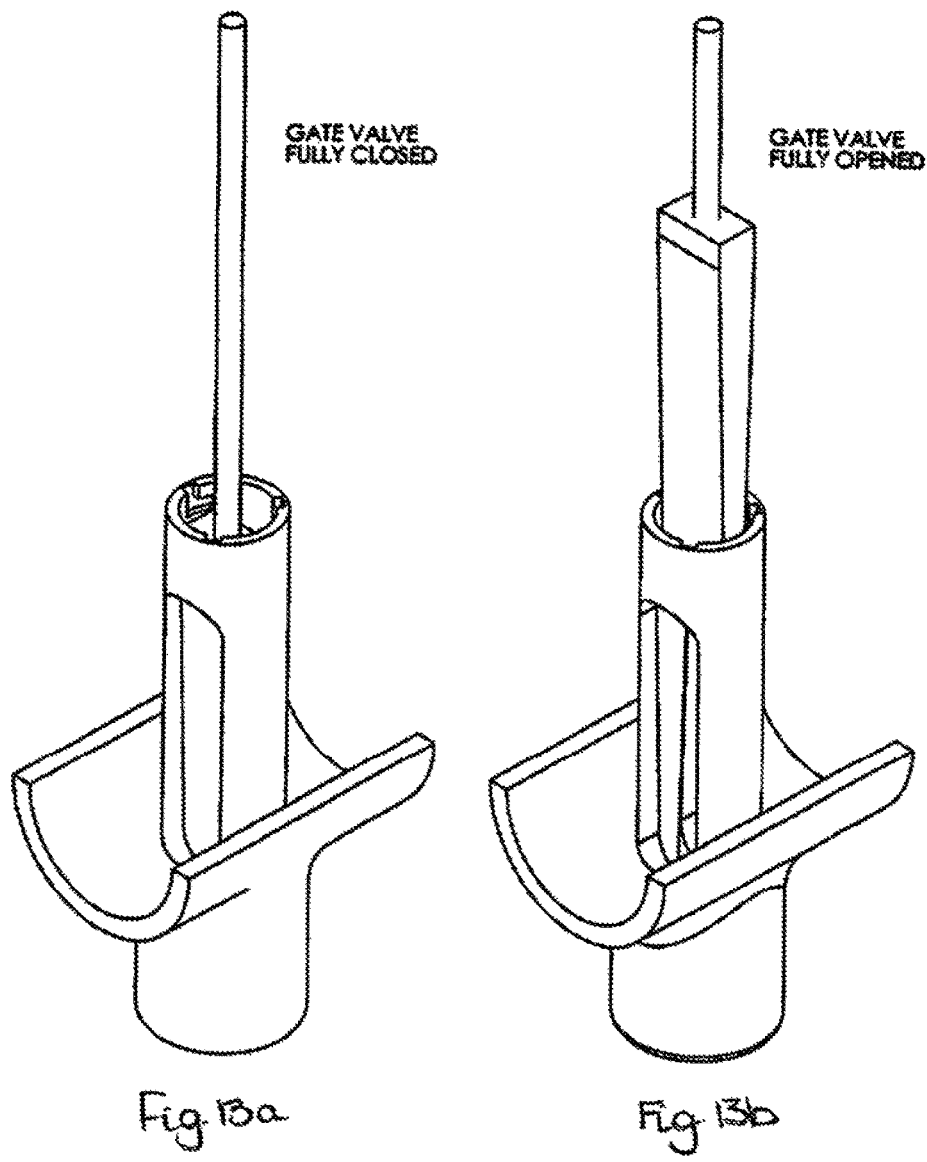

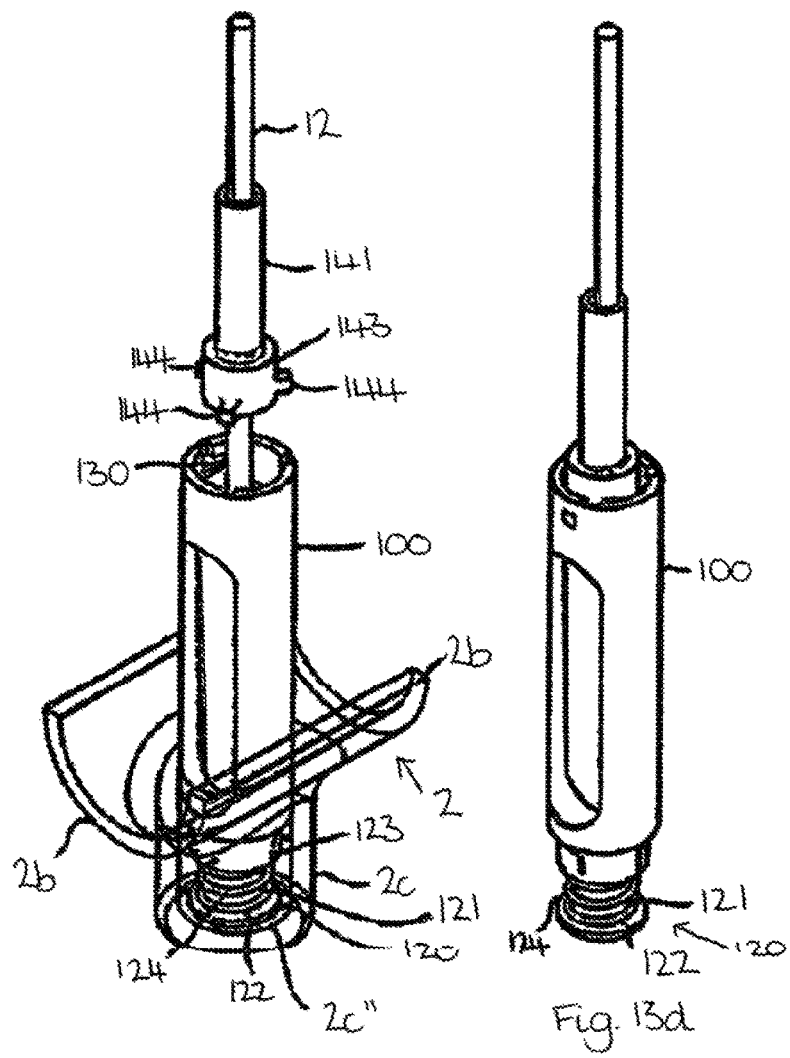

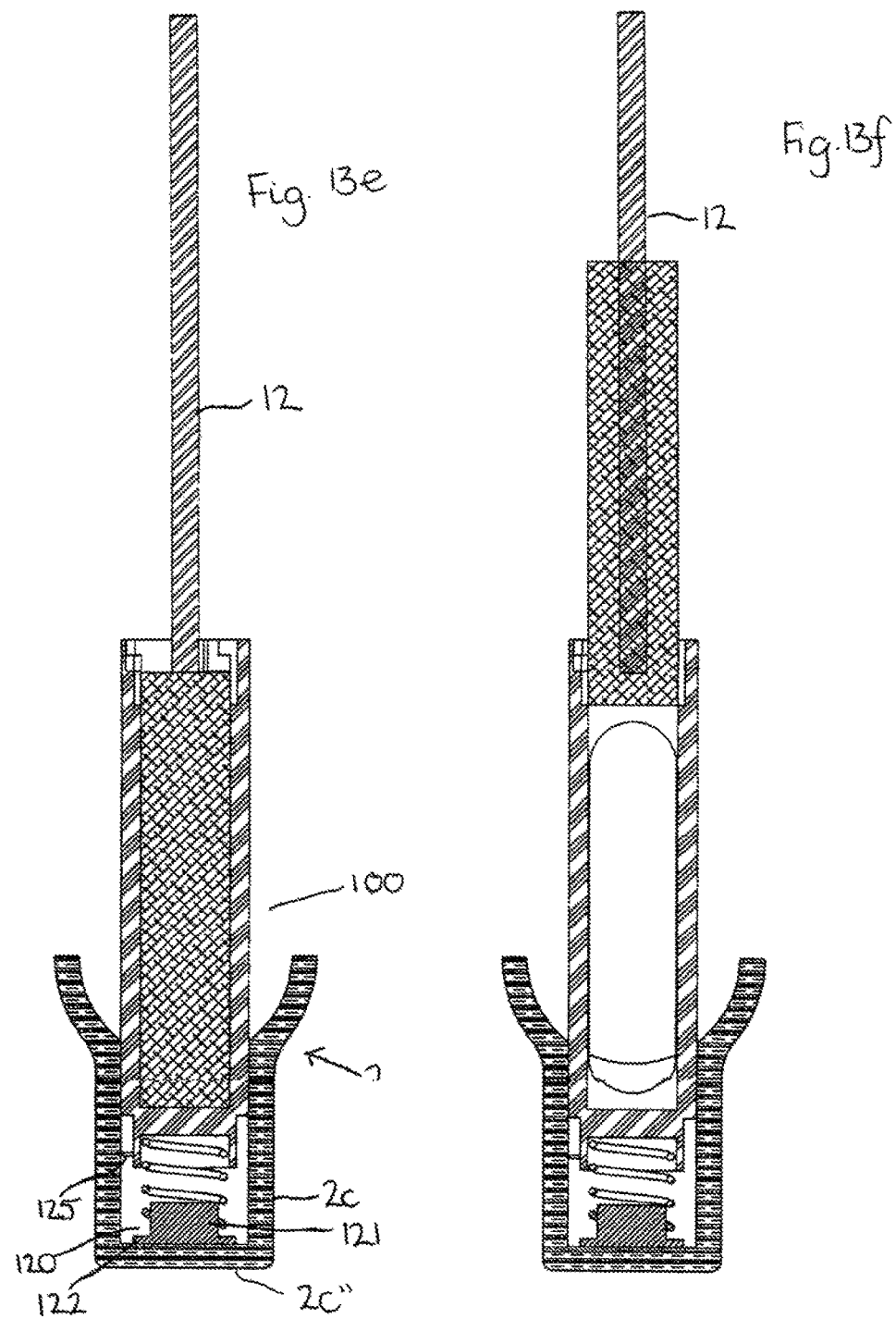

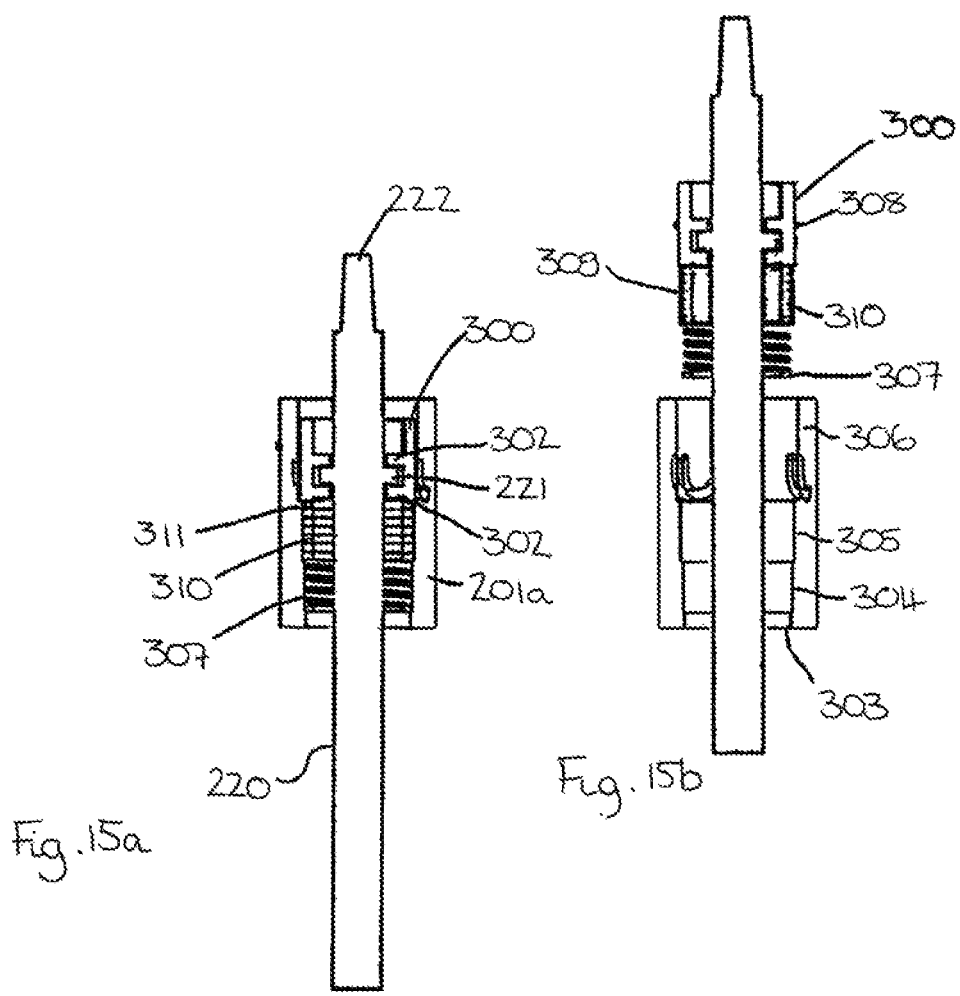

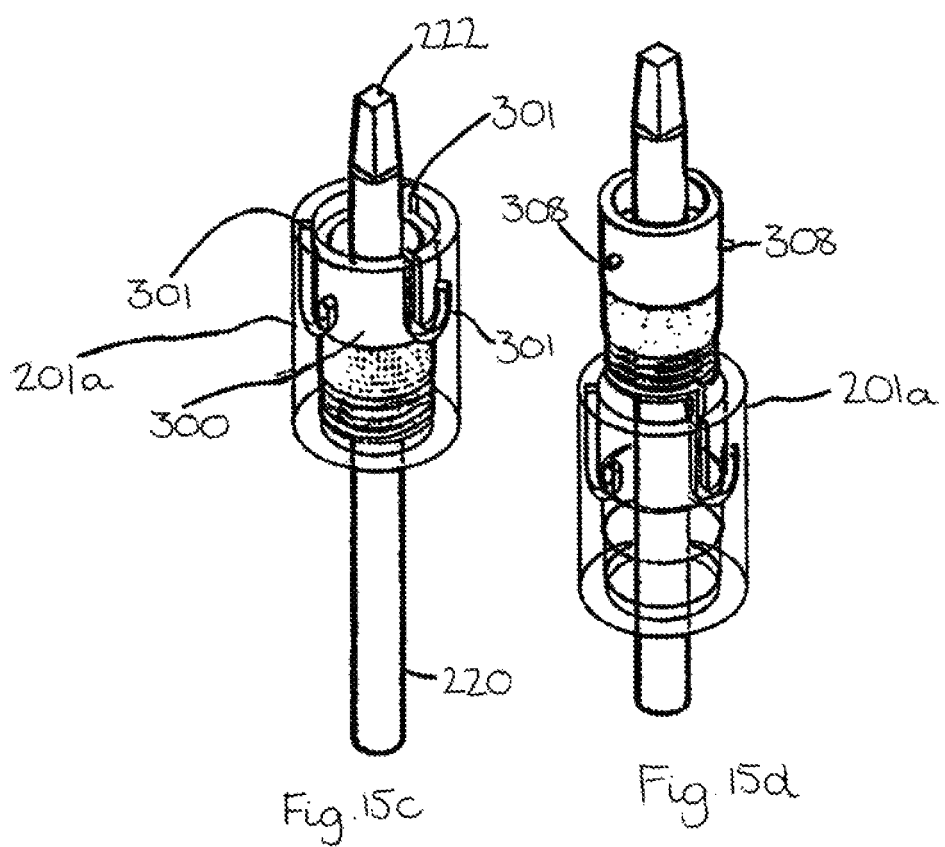

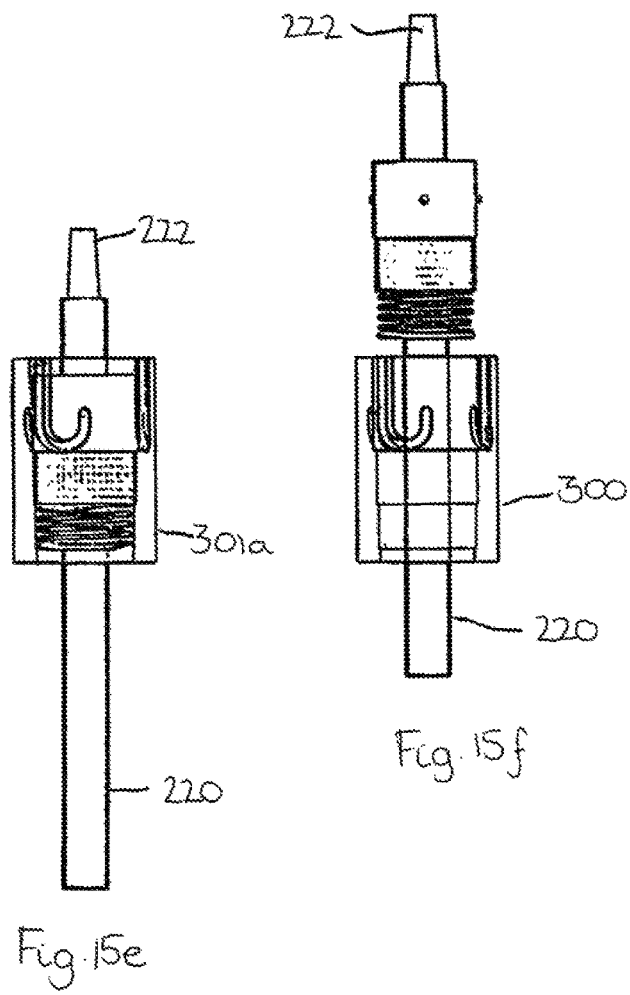

PIPELINE APPARATUS

FIELD OF THE INVENTION

The present invention relates to apparatus for use in a pipeline, and in particular to apparatus from which components thereof the valve may be extracted through the apparatus body.

BACKGROUND OF THE INVENTION

The present invention relates to valves, and more particularly to stop valves for controlling fluid flow through pipelines, such as subterranean or over ground pipes for fluid flow, e.g. water and gas pipes.

There are many miles of water and pipelines located underground in the UK, indeed elsewhere in the world. Valves are located at many points along these pipelines, to enable control of the flow of fluid through sections of the pipelines adjacent the valves. For example, many large diameter pipes are located deep underneath roadways, from which smaller diameter pipes branch off, each leading to separate industrial, commercial or residential properties to supply them with e.g. tap water or other non-treated forms of water. Should there be a water leak at one of these properties, a valve in the branch pipe to that property can be operated to stop the flow of water from the large diameter main pipe to the residence along the branch pipe.

These valves can take one of many forms, but essentially each has some sort of internal barrier member, such as a gate, a ball, a plug, or a disc (in the case of a butterfly valve), which is moveable to allow, to restrain, or to stop the flow of fluid through the valve. Such barrier members are usually moved by rotating a spindle which extends from the barrier member to the exterior of the valve, towards the ground level above the valve.

To operate one of these subterranean valves, an operative feeds a tool, e.g. tee-bar, valve key down an open shaft from ground level, which open shaft extends down to the valve. The operative aims to locate the end of their key on an e.g. tapered or shaped shank on the end of the spindle. Then, by rotating the key, the spindle is turned, thus moving the barrier member of the valve, to block or unblock the channel in the valve through which the fluid flows. Alternatively, the spindle of the valve may extend the majority of the way up the open shaft from the valve to the ground surface, allowing the service engineer to use a short key on the end of the long spindle to operate the valve.

In either case, such an open shaft cannot be left open to the elements since such an opening in a footpath or roadway poses a significant danger to pedestrians and drivers, etc. Thus, a cover plate is located in the roadway or footpath above the valve to cover the open shaft. As these cover plates usually need to withstand the weight of traffic passing over them, including heavy goods vehicles, it is preferred to make the cover plates as small as possible. Small cover plates need not be made as robust as larger ones to withstand the same mass.

Of course, these valves require maintenance, for example to replace a part of the closing mechanism of the valve after it becomes worn or damaged. In known pipelines, once the section of pipeline in which a valve is located is isolated from the rest of the pipeline network, (perhaps by closing valves upstream and downstream of the valve in question), or the pipeline is depressurised, the valve can be serviced. Conventional valves have a removable "bonnet" on their upper side (the term 'upper' is used here with reference to the relative orientation of the valve to the road surface above) which is held onto the main casing of the valve by a number of bolts to cover an access chamber in the valve. In many valves, once the bonnet has been removed, the closing mechanism of the valve can be accessed and removed for such servicing. In some cases the closing mechanism is of a closed-type, such as a plug valve, but such a valve still requires the removal of the outer bonnet to access the plug.

In order to be able to remove such a bonnet, a service engineer must be able to access the valve itself. Since the valves in question are located deep underground, e.g. 2 to 15 feet (0.6 m to 4.5 m) below ground level, this is not possible from the road surface. Also, the cover plate in the road surface and the underlying open shaft are too narrow to allow a service engineer to climb down. Thus, maintenance on such subterranean valves can only be carried out after excavation of the earth, tarmac, etc, above the valve, which is of course time consuming, expensive and highly inconvenient to pedestrians and motorists who, as a result of such excavation, may find roads closed or partially blocked with temporary traffic control systems in operation.

There are also several types of overland (above ground) valves which require the removal of a bonnet to access an access chamber within the valve for maintenance purposes. Although not requiring excavation, as in the case of subterranean valves, such a removal of a bonnet is time consuming, and thus costly.

Thus, there is a need for a valve that is suitable for subterranean use yet which has a flow control mechanism that can be serviced from ground level without the need to excavate the ground above and around the valve. There is also a need for an overland valve which can be quickly and cheaply serviced.

It is often necessary to carryout monitoring operations in fluid carrying pipelines. Monitoring may only be required from time to time, and hence it would be desirable to provide an apparatus into which a monitoring device may be fitted, yet easily be removed.

SUMMARY OF THE INVENTION

According to a first aspect of the invention there is provided pipeline apparatus comprising a housing including a riser and a pipeline connector and a seal pack assembly mounted in a member that is mounted in the riser, the apparatus including a shaft extending through the seal pack assembly, wherein the seal pack assembly includes at least one seal situated and configured to provide a seal between the outer surface of the shaft and a component of the seal pack assembly through which the shaft extends, said component being releasably attached to said member.

Preferably, the member mounted in the riser is releasably mounted in said riser.

According to a second aspect of the invention there is provided pipeline apparatus comprising a housing including a riser and a pipeline connector and a seal pack assembly mounted in a member that is releasably mounted in the riser, the apparatus including a shaft extending through the seal pack assembly, wherein the seal pack assembly includes at least one seal situated and configured to provide a seal between the outer surface of the shaft and a component of the seal pack assembly through which the shaft extends.

According to a third aspect of the invention there is provided pipeline apparatus comprising a housing including a riser and a pipeline connector valve seat mounting members, at least one valve seat and locking means configured to lock the at least one valve seat in a position in the housing.

Preferably, the locking means comprise elements mounted in the or each valve seat, the elements being retractable and extendible with respect to the valve seat.

Advantageously, the elements are elongate elements mounted in channels in the valve seat.

The locking means may include a rack and pinion and/or a lever mechanism.

According to a fourth aspect of the invention there is provided pipeline apparatus comprising a housing including a riser and a pipeline connector and a valve, wherein the valve is mounted in the pipeline connector and extends into the riser.

The apparatus may further comprise a shaft extending from the valve and through the housing and into a seal pack assembly situated at the end of the riser distal from the pipeline connector.

According to a fifth aspect of the invention there is provided a pipeline apparatus comprising a housing including a riser and a pipeline connector and a landing nipple attachable to the riser, the landing nipple having a seal pack assembly mounted therein.

According to a sixth aspect of the invention there is provided pipeline apparatus comprising a housing including a riser and a pipeline connector and a seal means mounted in a member that is mounted in the riser, the apparatus including a shaft extending through the seal means, wherein the seal means includes at least one seal configured to provide a seal between the outer surface of the shaft and a component of the seal means through which the shaft extends, the member releasably mounted in the riser and/or the component of the seal means through which the shaft extends releasably attached to said member, wherein the seal means and the shaft are removable from the riser.

The pipeline apparatus may further comprise seal means configured to provide a seal between the outer surface of the member and the inner surface of the riser.

The pipeline apparatus may further comprise a valve assembly, the valve assembly comprising a valve closure member, the valve closure member mounted on the shaft.

Preferably, the valve closure member is removable through the riser.

Preferably, the valve assembly includes at least one valve seat, and wherein the at least one valve seat is mounted releasably in the housing in the pipeline connector thereof.

Preferably, the at least one valve seat is removable from the housing through the riser.

Advantageously, the pipeline apparatus comprises at least one locking means configured to lock the at least one valve seat in position in the pipeline connector of the housing.

The locking means may comprise elements mounted in the or each valve seat, the elements being retractable and extendible with respect to the valve seat.

The elements may be elongate elements mounted in channels in the valve seat.

The locking means may include a rack and pinion and/or a lever mechanism and/or a cam and follower.

The pipeline apparatus may further comprise valve seat mounting means.

The valve seat mounting means may be comprised in the housing.

Preferably, the valve seat mounting means comprises a body, the body removably mounted in the housing.

The pipeline apparatus may comprise locking means configured to lock the body in the housing.

Preferably, the body is mounted in the housing for reciprocal and rotational motion with respect thereto and a biasing means in the housing is configured to urge the valve seat housing to reciprocate in the housing, the locking means configured to lock the body in position in the housing.

Preferably, the body comprises tool engaging elements, said elements providing for a tool engaged therewith to exert rotational and reciprocal forces on the body.

Preferably, the riser includes a riser extension piece.

Preferably, the member is mounted in the riser extension piece.

The valve assembly may extend into the riser.

Preferably, the pipeline comprises fastening means configured to fasten releasably the member to the riser, and/or fastening means configured to fasten releasably said component of the seal means to the member.

Preferably, the said component of the seal means is releasably mounted in the member, and the said component mounted in the member for reciprocal and rotational motion with respect thereto, and biasing means configured to urge the said component to reciprocate in the member, the fastening means configured to fasten the first component in position in the member, and wherein the shaft extends through the first and second components of the seal means.

Preferably, the seal means comprises a further component mounted in the member, the biasing means mounted between the components.

Preferably, the member is mounted in the riser for reciprocal and rotational motion, with respect thereto and a biasing means in the riser configured to urge the member to reciprocate in the riser, the fastening means configured to fasten the member in position in the riser, and wherein the shaft extends through the member.

The biasing means may be a spring.

Preferably, the member comprises a bearing surface for a thrust collar of the shaft.

Preferably, the fastening means comprises at least one cam and cam follower, the or each cam and cam follower providing a locked and an unlocked configuration.

Advantageously, the cam is J-shaped and the cam follower is configured to follow the J-shaped cam.

The J-shaped cam may be in the form of a slot and the cam follower is a protrusion engaging the slot.

Preferably, the member and/or the component of the seal means comprise tool engaging elements, said elements providing for a tool engaged therewith to exert rotational and reciprocal forces on the member and/or component of the seal means.

According to a seventh aspect of she invention there is provided tool adapted to engage tool engaging elements of a the member and/or the component of the seal means or the valve body, the tool composing a shaft and elements configured to engage the member and/or the component of the seal means and element mount, mounting the elements on the shaft.

Preferably, the shaft is configured to receive a handle.

Preferably, the element mount is a hollow body configured to receive a part of the member and/or component of the seal means therein.

The shaft may be hollow and configured to receive the shaft of the valve therein.

According to an eighth aspect of the invention there is provided a pipeline apparatus comprising a housing including a riser and a pipeline connector and a valve assembly, wherein the valve assembly comprises a valve configured to control the flow of fluid through the pipeline connector, a mounting means for releasably mounting the valve assembly in the riser and seal means, the seal means configured to seal against egress of fluid from the apparatus, the valve assembly and the riser each comprising a part of a locking means for releasably locking the valve assembly in the riser, the valve situated in the pipeline connector.

Preferably, the mounting means comprises a mandrel, the mandrel mounting one part of the locking means, a valve stem for raising and lowering the valve and first and second seal means, wherein the first seal means is a valve stem seal, and the second seal means is a mandrel seal.

Preferably, the valve assembly includes a valve seat and a valve closure member, the valve seat receiving the valve closure member, the valve seat comprising a fluid passageway therethrough, the valve controlling the opening and closing of the fluid passageway, the housing configured to receive the valve seat.

Preferably, the mandrel comprises a hollow body having an open end and a closed end, the valve stem passing through the closed end.

The pipeline apparatus, may further comprise connector members configured to connect the valve seat to the mandrel.

Advantageously, the valve seat comprises an inner member and an outer member, the valve engaging the inner member.

Preferably, the connector members engage the inner member of the valve seat.

Preferably, the housing is configured to receive the valve seat.

Preferably, the housing includes at least one recess for receiving a part of the valve seat.

Preferably, the valve stem comprises a thrust collar.

Advantageously, the thrust collar is supported on the closed end of the mandrel.

Preferably, the seal means comprises a seal mount, the seal mount mounting a first seal adapted to seal between the valve assembly and the riser and a second seal adapted to seal between the valve assembly and the valve stem thereof.

Preferably, the seal mount comprises at least a part of a thrust collar housing.

Advantageously, the seal mount is mounted on the mandrel.

The thrust collar housing may be formed by the seal mount and closed end of the mandrel.

The locking means may be a first element mounted in the valve assembly configured to engage a second element mounted in the riser, the first element being moveable between a first position in which the first element is engaged with the second element and a second position in which the first element is disengaged from the first element.

The locking means may comprise at least one J-shaped cam associated with one of the housing and the mounting means of the valve assembly and at least one cam follower associated with the other of the housing and the mounting means, the valve assembly configured to permit reciprocal and rotational movement between the mounting means and the riser.

The pipeline apparatus may further comprise a collar assembly attachable to the end of the riser remote from the pipeline connector, and may further comprise at least one extension member attachable to the riser by means of the collar assembly.

According to a ninth aspect of the invention there is provided a pipeline apparatus comprising a housing including a riser and a pipeline connector, a valve seat mount, at least one valve seat, the at least one valve seat removable from the housing through the riser.

The pipeline apparatus may further comprise locking means configured to lock the at least one valve seat in a position in the housing.

The locking means may comprise elements mounted in the or each valve seat, the elements being retractable and extendible with respect to the valve seat.

The elements may be elongate elements mounted in channels in the valve seat.

The locking means may include a rack and pinion and/or a lever mechanism or a cam and follower.

The valve and valve seats may be mounted in the pipeline connector and extend into the riser.

The pipeline apparatus may further comprise a shaft extending from the valve and through the housing and into a seal pack assembly in the riser or an extension thereof distal from the pipeline connector.

The pipeline apparatus may comprise a landing nipple attachable to and extending the riser, the landing nipple having a seal pack assembly mounted therein.

According to a tenth aspect of the invention there is provided a pipeline apparatus comprising a housing including a riser and a pipeline connector and a valve, wherein the valve is mounted in the pipeline connector and extends into the riser.

The pipeline apparatus may further comprise a shaft extending from the valve and through the housing and into a seal pack assembly situated in the riser or an extension thereof distal from the pipeline connector.

The pipeline apparatus may further comprise a valve seat mount, at least one valve seat, the at least one valve seat removable from the housing through the riser.

The pipeline apparatus may further comprise locking means configured to lock the at least one valve seat in a position in the housing.

The locking means may comprise elements mounted in the or each valve seat, the elements being retractable and extendible with respect to the valve seat.

The elements may be elongate elements mounted in channels in the valve seat.

The locking means may include a rack and pinion and/or a lever mechanism and/or cam and follower.

The valve and valve seats may mounted in the pipeline connector and extend into the riser.

Preferably, the pipeline apparatus further comprises a shaft extending from the valve and through the housing and into a seal pack assembly in the riser or an extension thereof distal from the pipeline connector.

The seal pack assembly may be releasably mounted in the riser or extension thereof.

The pipeline apparatus may comprise a landing nipple attachable to and extending the riser, the landing nipple having a seal pack assembly mounted therein.

BRIEF DESCRIPTION OF THE DRAWINGS

In the drawings, which illustrate preferred embodiments of the invention:

FIG. 1d illustrates the apparatus shown in FIG. 1a in use at different levels below a road surface;

FIG. 1f is a detail view of the valve seats of the apparatus shown in FIGS. 1a to 1e;

FIG. 2a is schematic representation, of a locking arrangement;

FIG. 2b is an exploded view of the locking arrangement illustrated in FIG. 2a;

FIG. 3a is a detailed schematic representation of the locking mechanism illustrated in FIGS. 2a and 2b;

FIG. 3b is a schematic cross-sectional representation of the locking mechanism illustrated in FIG. 3a;

FIG. 4 is a schematic representation of a valve seat;

FIG. 5a is a schematic representation of a valve stem assembly;

FIG. 5b is a schematic representation of a tool for extracting and replacing the valve stem assembly illustrated in FIG. 5a;

FIG. 6 is a schematic representation of a first type of housing;

FIG. 7 is a schematic representation of a second type of housing;

FIG. 8 is a schematic representation of a third type of housing;

FIG. 9 is a plan view of an embodiment of a valve seat locking mechanism;

FIG. 10 is a plan view of another embodiment of a valve seat locking mechanism;

FIG. 10a is a schematic representation of a valve seat locking mechanism of the type shown in FIG. 10;

FIG. 10b is a schematic representation of a gate valve according to the invention having a valve seat locking mechanism as shown in FIG. 10a;

FIG. 11a illustrates a butterfly valve in a closed state;

FIG. 11b illustrates a butterfly valve in an open state;

FIG. 12 illustrates a plug valve;

FIG. 13a illustrates an apparatus according to another embodiment of the invention with the valve therein closed;

FIG. 13b illustrates the apparatus shown in FIG. 13a with the valve therein open;

FIG. 13c illustrates the apparatus of FIG. 13a with the valve seat assembly and pulling tool shown in detail;

FIG. 13d illustrates the valve seat assembly and pulling tool;

FIG. 13e is a cross-sectional representation of the apparatus shown in FIG. 13a;

FIG. 13f is a cross-sectional representation of the apparatus shown in FIG. 10b;

FIG. 15a is a cross-sectional schematic representation of an alternative sealing and locking arrangement for the apparatus of FIGS. 14a to 14e;

FIG. 15b is a cross-sectional schematic representation of the sealing and locking arrangement for the apparatus shown in FIG. 15a, in a release state;

FIGS. 15c and 15d are schematic representations corresponding to the arrangements shown in FIGS. 15a and 15b; and FIGS. 15e and 15f are side views corresponding to the arrangements shown in FIGS. 15a to 15d.

DETAILED DESCRIPTION OF THE PREFERRED EMBODIMENTS

Figure 1B:
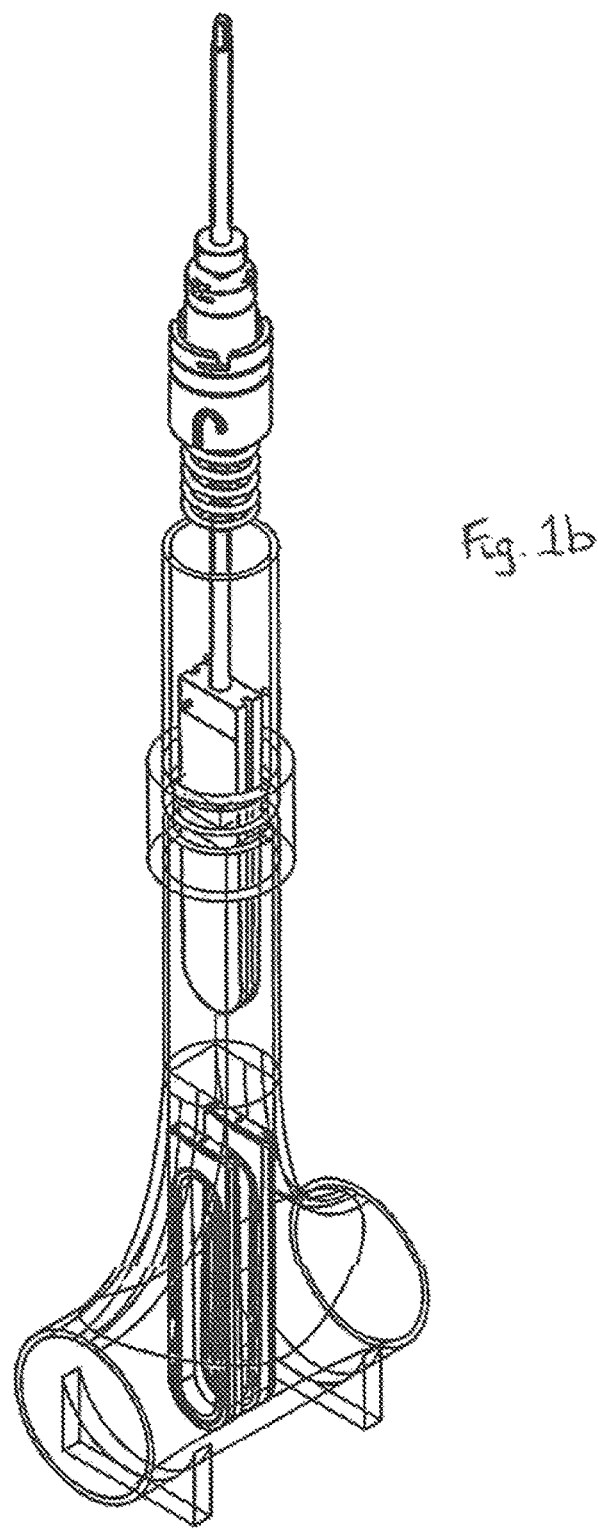
FIG. 1b is a schematic representation of the apparatus illustrated in FIG. 1a with the valve gate and bonnet assembly partially extracted from the apparatus body.
Figure 1C:
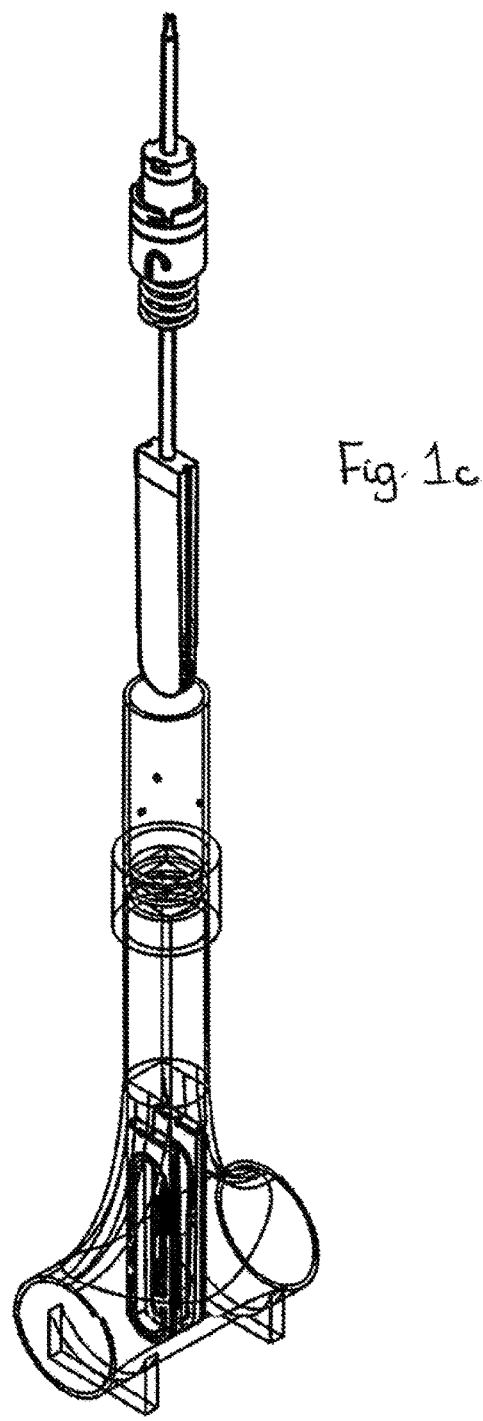
FIG. 1c is a schematic representation of the apparatus illustrated in FIGS. 1a and 1b with the valve gate and bonnet extracted from the apparatus body.
Figure 1A:
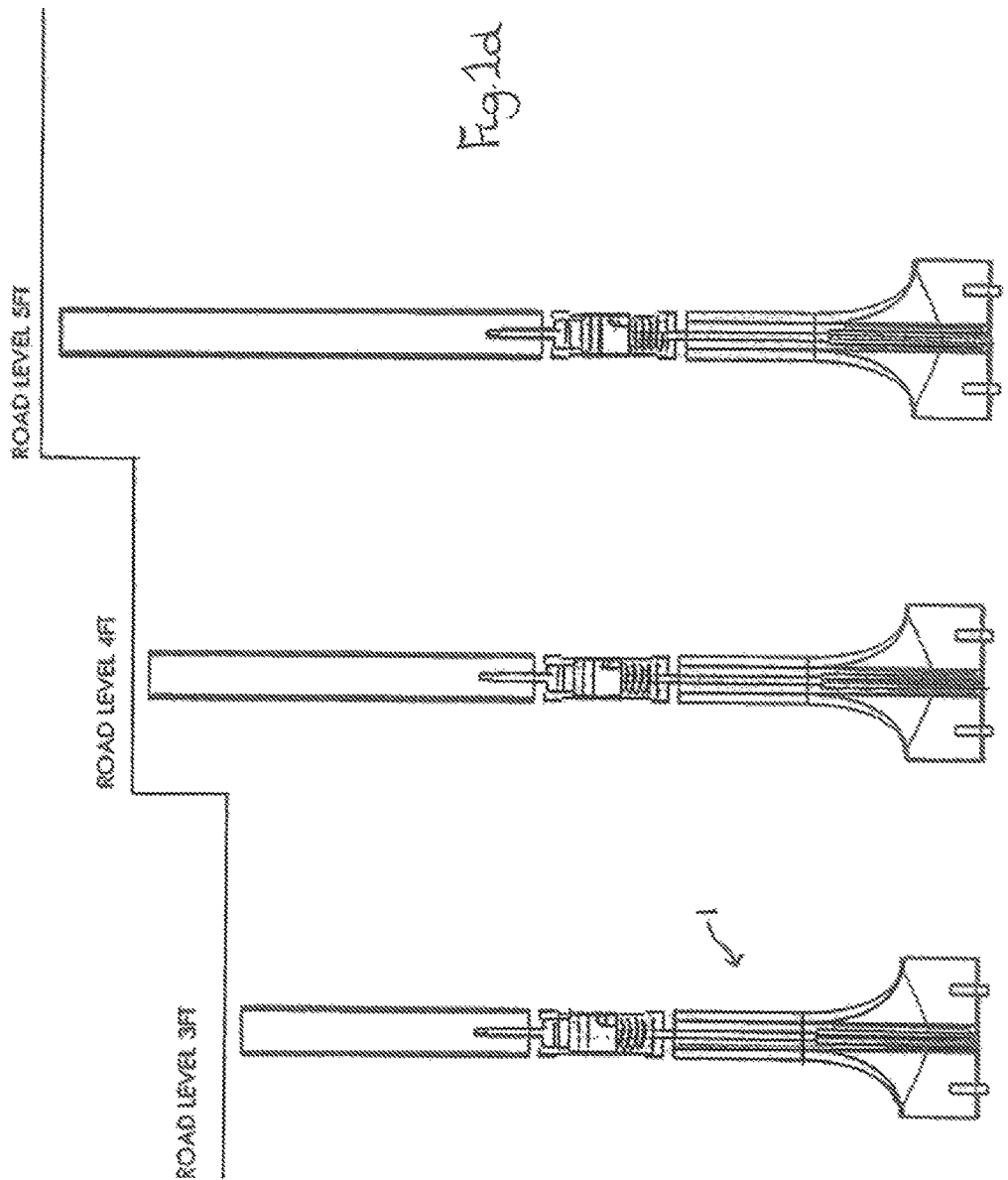
FIG. 1a is a schematic representation of apparatus of a first embodiment of the invention.

Referring now to FIGS. 1a to 1d, there is shown a fluid control apparatus 1 comprising a housing 2 including a riser 2a and a pipeline connector 2b. In use, the pipeline connector 2b forms part of a larger pipeline system.

The apparatus 1 includes a gate valve 3 comprising valve seats 4, each having an opening 4a therein. The valve seats include channels 5 to each side thereof which engage with rails 10 formed in the wall of the housing 2. The rails 10 extend along the inner surfaces of both the riser 2a and pipeline connector 2b. The channels 5 and rails 10 secure the valve seats 4 in position in the axial direction of the pipeline connector 2b. In order to secure the valve seats 4 in position in the axial direction of the riser 2a locking pins 6 are provided in the valve seats 4 which engage with indents in the rails 10.

A gate valve 3 includes a gate 7 located between the valve seats 4. In the illustrated example, the gate 7 corresponds in shape substantially to the shape of the valve seats 4. The sides of the gate 7 include channels 8 which engage with rails 9 that extend along the inner surfaces of both the riser 2a and pipeline connector 2b. The channels 9 and rails 9 secure the position of the gate 7 in the axial direction of the pipeline connector 2b. The gate 7 is arranged such that it may be raised and lowered to open or close a fluid passage way between the openings 4a of the valve seats 4. The gate 7 is mounted on a stem 12, which may be a non-rising stem, where the gate valve rises with respect to the stem 12 upon rotation thereof, for example where the stem 12 is threaded externally and the bore in the gate in which the stem is located is internally threaded, rotation of the stem causing the gate 7 to rise. Alternatively, the stem may be a rising stem, where the stem is rotatable mounted so the gate 7, but not movable axially therewith. In a rising stem, another part of the stem is externally threaded and part of another component of the apparatus 1 internally threaded. Hence, when the stem 12 is rotated, the stem 12 and gate 7 which is attached thereto rises and falls with the gate 7. The stem 12 has a square tapered end 14 for engagement with a handle (not shown).

Referring now to FIG. 1f, which illustrates the gate valve 3 in greater detail, the valve seats 4 are provided with seals 4b on each face thereof. Each valve seat 4 has a cover plate 15 attached to the upper surface thereof. A drive 16 extends through an opening in the cover plate 15. The drive 16 is connected to a mechanism that is arranged to move the pins 6 into and out of indents in the rails 10. The mechanism is described in greater detail with reference to FIGS. 9 and 10 below.

As will be appreciated from FIGS. 1a to 1f, the components of the gate valve 3 are sufficiently small to pass through the riser housing 2a. It is desirable for the fluid passageway through the valve seats to be of a similar cross-sectional area to the diameter of the pipeline connector 2b. This is provided for by arranging for the valve seats 4 and the openings 4a therein to extend beyond the plane of the outer wall of the pipeline connector 2b. In FIGS. 1a to 1f the apparatus is configured such that the openings 4a extend beyond the plane of the outer wall of the pipeline connector 2b in the direction of the riser housing 2a.

Figure 2B:
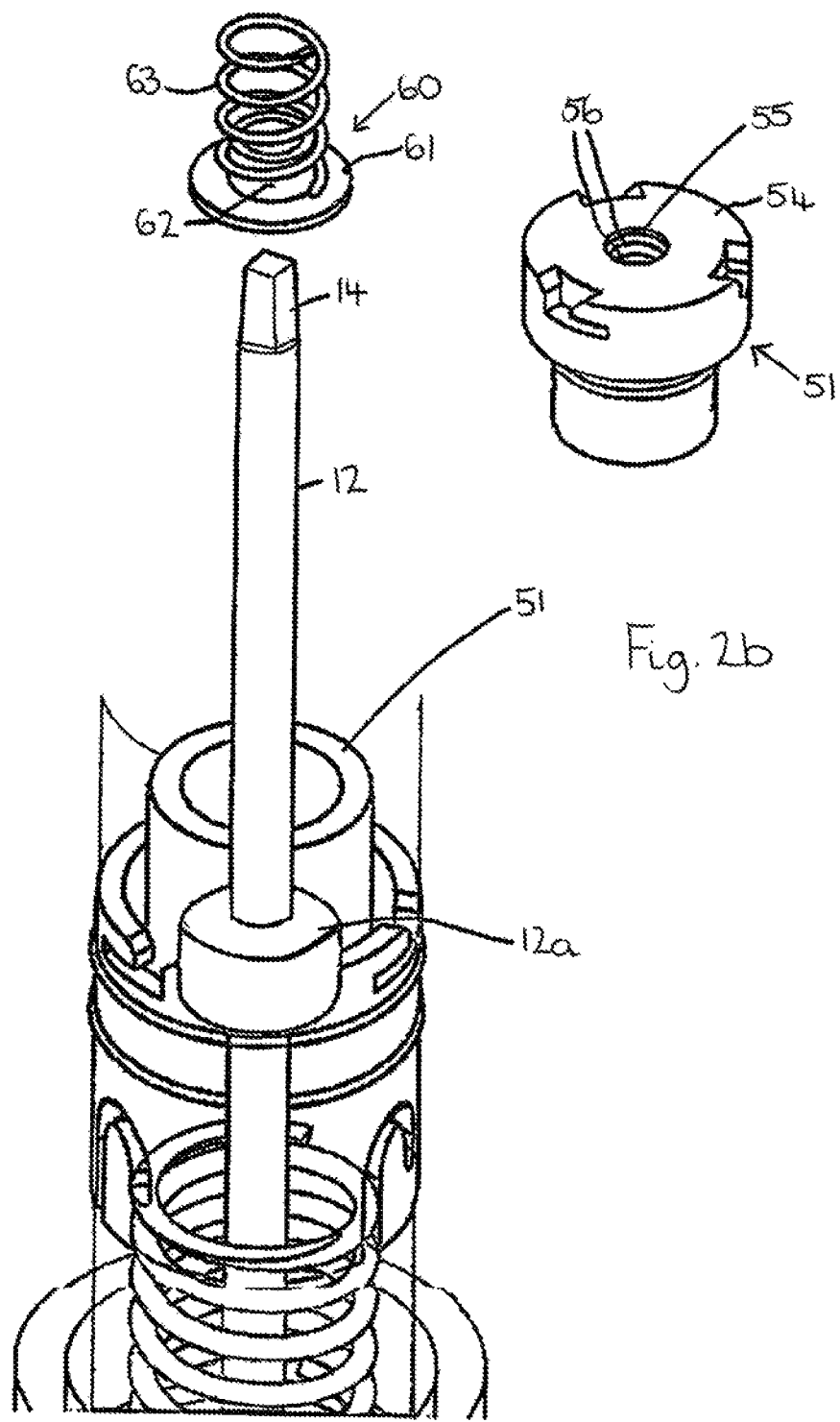

FIGS. 2a and 2b illustrate components of a landing nipple 20. The landing nipple 20 comprises a housing 21 attached to the riser housing 2a by a collar 22. In the illustrated example the housing 21 is of substantially the same external and internal dimension as the riser housing 2a. The landing nipple 20 also includes another collar 23 to which may be attached an extension member as shown in FIG. 1d, or a cover (not shown).

The landing nipple 20 includes a member 25 for securing the gate 7 and the stem 12 in position in the housing 2. The member 25 is of the same shape as the housing 21 and has an external diameter slightly less than the internal diameter of the housing 21. Two vertically spaced apart O-rings 26 are mounted in grooves 26' on the outer surface of the member 25. These O-rings provide a seat between the inner surface of the housing 21 and the outer surface of the member 25.

The member 25 includes parts of a locking arrangement for locking the said member 25 with respect to the housing 21. The parts of the locking arrangement comprised in the member 25 include three inverted J-shaped channels 21. The inverted J-shaped channels include a first portion 27a which provides an opening in the lower edge of the member 25, a semi-circular portion 27b and a downwardly extending portion 27c having a closed end.

These channels are configured to engage with a second part of the locking arrangement comprised in the housing 21. This second part of the locking arrangement comprises a protrusion 28 extending from the inner surface of the housing 21 into the J-shaped channels. Such a protrusion may be formed integrally with the housing 21, for example where the housing 21 is a plastics moulding, or the protrusion maybe a separate component fixed into the wall of the housing 21, for example a pin fixed into a hole. This could be achieved from either side of the wall of the housing 21.

Figure 1E:
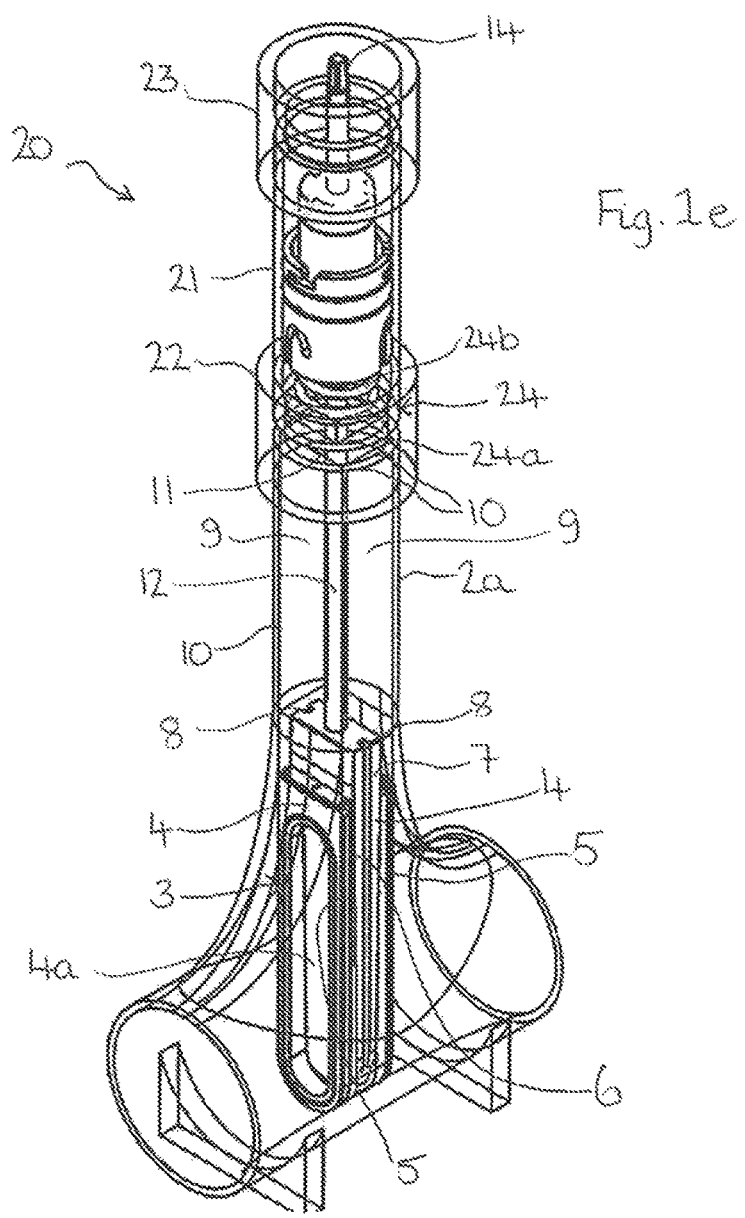
FIG. 1e illustrates the apparatus shown in FIGS. 1a to 1c with additional components shown.

A biasing element in the form of a coil spring 24 is situated in the housing 21 beneath the member 25. Referring also to FIG. 1e, it can be seen that the riser housing 2a includes a wall 11 extending radially inward and forming an opening that is square in cross-section. The lower end 24a of spring 24 sits on the wall 11 and is prevented from movement into the riser housing 2a by this wall.

The landing nipple 20 includes means to support the member 25 on the spring 24. This may be a plate which is configured to be received on the stem 12 and pass over the protrusions 28, for example such a plate may be provided with suitably situated and shaped slots through which the pins 28 may pass, yet to extend under the lower edge of the member 25 and over the upper end of the spring 24.

Alternatively, the member 25 may include tabs extending inwardly to engage the upper end 24b of the spring 24.

The member 25 further includes elements configured to engage with an extraction tool. The upper edge of the member 25 includes L-shaped slots 30 comprising a vertically oriented opening 31 extending through the upper edge of the member 25, the opening 31 having chamfered edges 52. The opening 31 extends into a horizontal slot part 35 of the L-shaped slot 30. The member 25 includes three L-shaped slots 30 situated equidistantly around the member 25.

Referring also to FIGS. 5a and 5b, a tool 40 for engaging L-shaped slots 30 is shown. The tool 40 comprises a shaft 41 having a square tapered end 42 for engagement with a handle (not shown). The lower end of the shaft 41 has a cylindrical member 43 attached thereto. Tabs 44 extend outward from the lower edge of the cylindrical member 43. The spacing of the tabs 44 around the cylinder corresponds to the spacing of the openings 31 of the L-shaped slots 30. The tabs 44 are of such width and depth as to be able to pass vertically into the opening 31 and horizontally into the horizontal slot part 33. The cylindrical member 43 is of such dimension as to receive the stem 12 therein whilst the tabs 44 are situated in the horizontal slot parts 33.

The tool 40 is used to remove the member 25 and all components physically linked to. The tabs 44 are introduced into the openings 31 and the tool 40 rotated so that tabs 44 engage in the horizontal slot parts 33. The tool 40 is then pressed downward causing the member 25 to move downward against the force of spring 24, compressing the spring. The protrusions 28 rise relative to the part 27c of the inverted J-shaped slot 27. As the protrusion encounter the curved part 27b of the inverted J-shaped slot 27 the member 25 is caused to rotate anti-clockwise with the arrangement as illustrated in FIGS. 2a and 2b. When the protrusion 28 reaches the apex of the curved part 27b the shape of the slot 27 causes the member 25 to rotate further anti-clockwise until the protrusion 28 is aligned with the first portion 27a of the slot 27 whereupon the member 25 is free to be pulled out of the housing 21. The force of spring 24 pushes the member upward until the spring reaches its natural point of extension. The member 25 is attached to the tool 40, hence lifting the tool lifts the member 25 out of the housing 21.

The member 25 includes a part 25' which provides a housing 25" for a seal pack assembly 50. The seal pack assembly includes a cap 51 which is mounted in part 25' in a similar way to which the member 23 is itself mounted in housing 21. The cap 51 includes a part 32 of a first diameter, which is slightly less than the internal diameter of part 25', the part 52 sitting inside the part 25'. Seals in the form of O-rings 53 are located in grooves 53' on the outer surface of part 52. They provide a seal between the outer wall of part 52 and the inner wall of part 25' of member 25.

The cap 51 further includes a second part 54 of a second diameter larger than the first. The second part 54 closes the housing 25".

Shaft 12 passes through a bore 55 extending through the cap 51. A plurality of O-rings 56 is mounted in grooves in the surface of the bore 55. In FIG. 2b two O-rings 56 can be seen. Another two O-rings 56 are out of view.

The shaft 12 includes a thrust collar 12a of larger diameter than the main body of the shaft. The thrust collar 12a is so dimensioned as to be a sliding fit into the housing 25". The edge of a lower surface of the thrust collar 12a engages with a wall 25a of the housing 25" and limits movement of the shaft with respect to the member 25.

The seal pack assembly includes a top hat washer 60 having a horizontally extending portion 61 and a vertically extending portion 62. A coil spring 63 sits on the top hat washer about the vertically extending portion 62.

Referring again to FIG. 3b, the top hat washer 60 is mounted on the shaft 12, the horizontally extending portion 61 sitting on top of the part 12a of the shaft. The vertically extending position 62 maintains the spring 63 in the correct position.

The arrangements of locking and releasing the cap 51 from part 25' are functionally equivalent to the arrangements for locking and releasing the member 25 from housing 21. In view of this the same reference numerals are used to indicate the same parts but denoted as the prime of the reference numeral in question. So inverted J-shaped slot 27 becomes inverted J-shaped slot 27' and so on.

Three inverted J-shaped slots 27' are provided equidistantly around the part 52 of cap 51. These engage with a protrusion 28' in the same way as described with reference to the engagement of protrusion 28 in slot 27, save that the J-shaped slots 27' are mirror images of the slots 27. This means that when the cap 51 is pushed down against the force of spring the cap 51 is caused to move clockwise as opposed to anti-clockwise as is the case for member 25. The upper part 54 of the cap 51 includes L-shaped slots 30'. These L-shaped slots 50' are mirror images of the L-shaped slots 30. It is important that the member 25 and the cap 51 are arranged to move in opposite directions, so that removal of the cap 51 does not released the housing 25.

It will be appreciated that the seal pack 50 assembly may be removed for servicing without removing the gate 7. To remove the seal pack 50 all that is required is for the gate 7 to be closed and the cap 51 to be engaged with a tool 40 suitably dimensioned to engage with the L-shaped slots 30'. The tool 40 is rotated anti-clockwise so that it is "home" in the horizontal parts 33' of the slots 30'. The tool is pressed downward which releases the protrusions 28' off inverted J-slots 27' allowing the cap 51 which is captured on the tool 40 to be lifted out of the housing 25' and off the shaft 12. Any damaged seals may then be replaced and the components re-assembled.

FIG. 6 shows an alternative embodiment of the apparatus where the pipeline connector 2b of housing 2 includes flanges 2b' having a plurality of holes 2b" for attachment to another flange. An extension member 70 is mounted on top of the landing nipple 20.

FIGS. 7 and 8 illustrate differently shaped housings 2, each having a portion 2c, 2c' extending from the underside of the pipeline connector 2c. The gate valve may be partially housed in the portion 2c, 2c'.

Referring now to FIG. 9, pins 6 are slidably mounted in channels 4c. When the pins 6 are withdrawn into the channels 4c the valve seat may slide with respect to the housing 2. When extended into indents in the housing 2, rails thereof in the present example, the valve seats 4 are locked in position in the housing 2. The mechanism illustrated in FIG. 9 includes racks 6a formed in the pins 6 and a pinion wheel 17 having teeth 18 for engaging with the racks 6a. The pinion wheel 17 includes a socket 19 for receiving the drive 16, a square drive in the illustrated example. In use, when a suitable tool is attached to the drive 16 and rotated, the pins 6 may be retracted into or extended out of the channels 4c. The pinion wheel 17 also includes a hole 20. The inaction of the hole 20 to receive a frangible pin, which extends through the hole and engages in an indent in the valve seat 4.

For insertion of the valve seat 4 into the housing 2 the pins 6 are retracted. With the valve seat 4 located in the housing, the pinion wheel 17 is aimed by means of a suitable tool as described above until the pins 6 extend into indents in the housing and such that the hole 20 is aligned with an indent in the valve seat 4. A frangible pin is then inserted into the hole 20 and into the aligned indent, thereby locking the pins 6 in their extended configuration. To remove the valve seat, the pinion wheel 17 is turned in the opposite direction, breaking the frangible pin. With the valve seat removed, the parts of the broken frangible pin may be removed.

FIG. 10 illustrates an alternative mechanism for extending and retracting the pins 6. The mechanism utilises levers 23, 24 in place of the rack and pinion of the mechanism illustrated in FIG. 9. A rotatable member 21 mounting levers 23 on either side of the member 21 is located in a bore 22. Each lever 23 is pivotally connected to a lever 24 by a pin 25a. The lever 24 is pivotally connected to the pin 6 by 6 by a pin 25b, the pin 6 being slidably mounted in a channel 6a. Suitable space is provided in the valve seat 4 to accommodate movement of the levers 23, 24. By rotating the member 21, the pins 6 may be extended or retracted. Frangible pins and holes for receiving such pins are not shown in FIG. 10. However, such pins could be accommodated in the rotatable member 21 and valve seat 4 for example.

The apparatus of the invention is not limited to gate valves. The gate 7 may be replaced by a butterfly valve 80 as shown in FIGS. 11a and 11b. The butterfly valve 80 includes a frame 81 and butterfly wings 82 to each side of shaft 12. The frame 81 sits between valve seats 4. The wings 82 open into the openings 4a in the valve seats 4.

FIG. 12 illustrates a plug valve 90 including an outer wall 91 surrounding a cavity 92 and a shaft 12. In use the part of the shaft 12 below the wall 91 is supported in a bore. By rotating the shaft 12 the plug valve 90 may be moved between open and closed configurations.

The apparatus is not limited to use of a valve. Numerous components may be mounted on the shaft 12. A flow meter or camera for example may be placed within a frame such as the frame 81. The apparatus may be used as a line stop, with an inflatable balloon being mounted on the end of the shaft 12. The shaft 12 may be configured such that a wire may pass therethrough, or the monitoring apparatus may communicate wirelessly.

Referring now to FIGS. 13a to 13f, there is shown an alternative arrangement of the apparatus. This embodiment comprises a valve body 100 in which valve seats are mounted. The valve body 100 is removably mounted in the housing 2. In the illustrated example, the valve housing 2 includes a portion 2c extending from the underside of the pipeline connector 2b.

The portion 2c includes part of a locking mechanism, in the form of a protrusion 125 extending from the inner wall of the portion 2c which engages with J-shaped channels 123 of the valve body 100 to releasably lock the valve body 100 in place in the valve housing 2. The lower end of the valve body 100 sits on and is attached to a spring 124, which is itself mounted on and attached to a cap 120. The cap 120 sits on the end face 2c" of the portion 2c of housing 2. The cap 120 includes a cylindrical part 121 which the spring 124 surrounds and an end flange 122 which the end face of the spring 124 abuts.

The J-shaped channels provide for the selective locking and unlocking of the valve body 100 to the housing 2 in the same manner as described above in relation to earlier embodiments.

The riser housing of the housing 2 is not shown in FIGS. 13a to 13f. However, this part is substantially the same as that shown in FIGS. 1a to 1e, and would have a landing nipple attached thereto in the same way, since it is the landing nipple that provides the seal around the stem 12.

Whereas the arrangement illustrated in FIGS. 1 to 12 includes valve seats which engage with the housing 2, the arrangement illustrated in FIGS. 13a to 13f requires the valve body 100 to engage with the housing 2, the valve seats being mounted in the valve body 100.

The arrangement illustrated in FIGS. 13a to 13f provides two distinct advantages over the arrangement shown in FIGS. 1 to 12. First, the valve body 100 may mount valve components for different types of valve. Therefore, producing a range of fluid control apparatus is simplified, since part that fits into the housing 2, the valve body 100 is the same, even when different valve components are to be used. Second, servicing of the said control apparatus is simplified. In order to remove the valve body 100 and the valve components mounted therein, all that is required is for the top edge of the valve body 100 to be engaged by the tool 140, which is similar to the tool 40 illustrated in FIG. 5b, save that the shaft 141 thereof is hollow so that it may pass over the valve stem 12. L-shaped slots 130 are formed in the upper part of the inner wall of valve body 100. The tool 140 comprises a cylindrical member 143. Tabs 144 extend outward from the lower edge of the cylindrical member 143. The tabs 144 are configured to engage the L-shaped slots 130. With the tabs 144 so engaged, the whole valve body 100 may be pressed downward to release the valve 100, releasing the valve body, and hence also the components mounted therein, from the housing 2.

The arrangement shown in FIGS. 14a to 14e is different again. In this arrangement the valve, the valve seats, and the apparatus for locking the valve are comprised in a valve assembly 210, a single component, which may be introduced into and removed from the housing 201 through the riser 201a thereof.

Figure 14A:
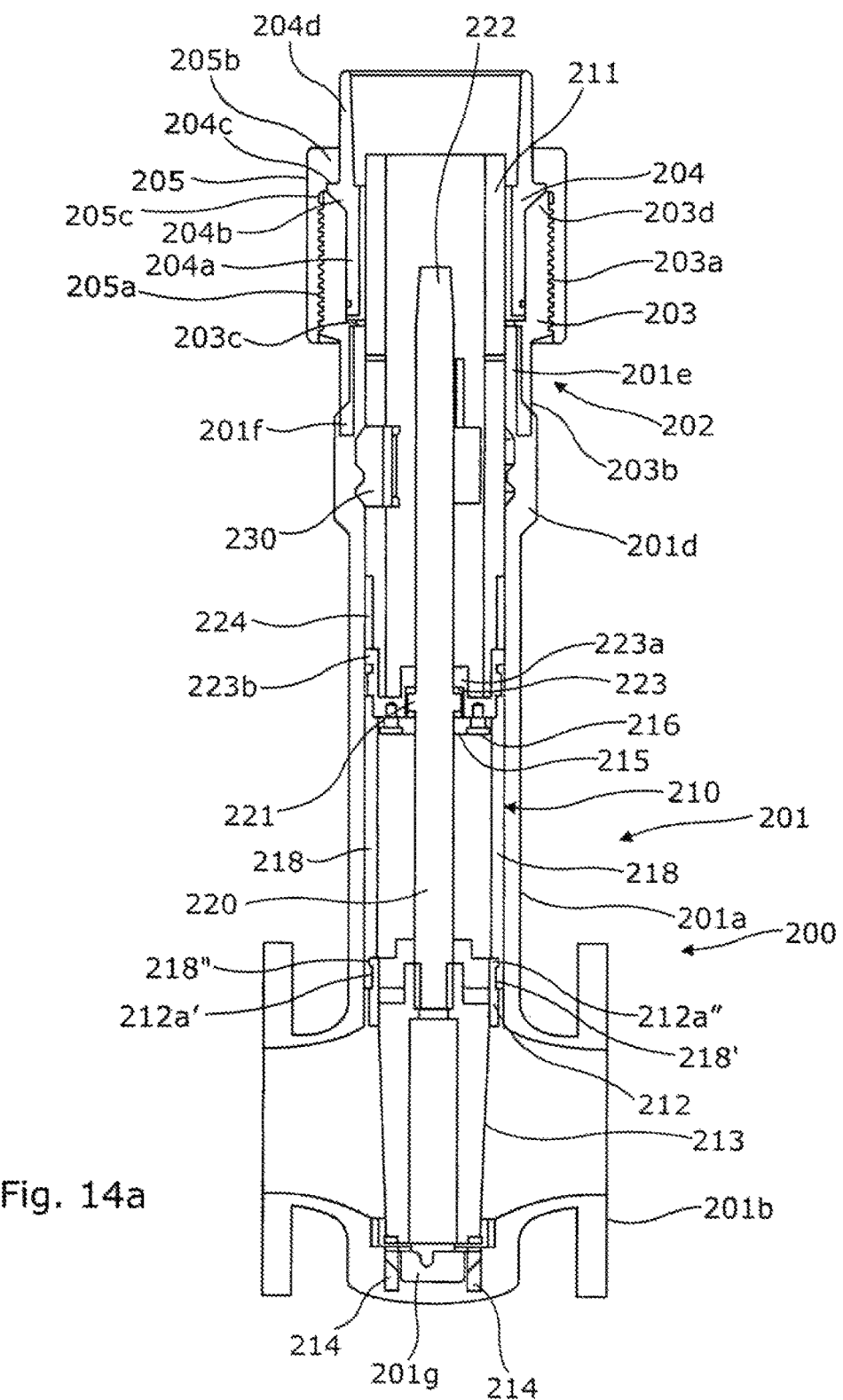
FIG. 14a is a schematic representation of apparatus according to another embodiment of the invention with the valve assembly locked in position and the valve closed.
Figure 14B:
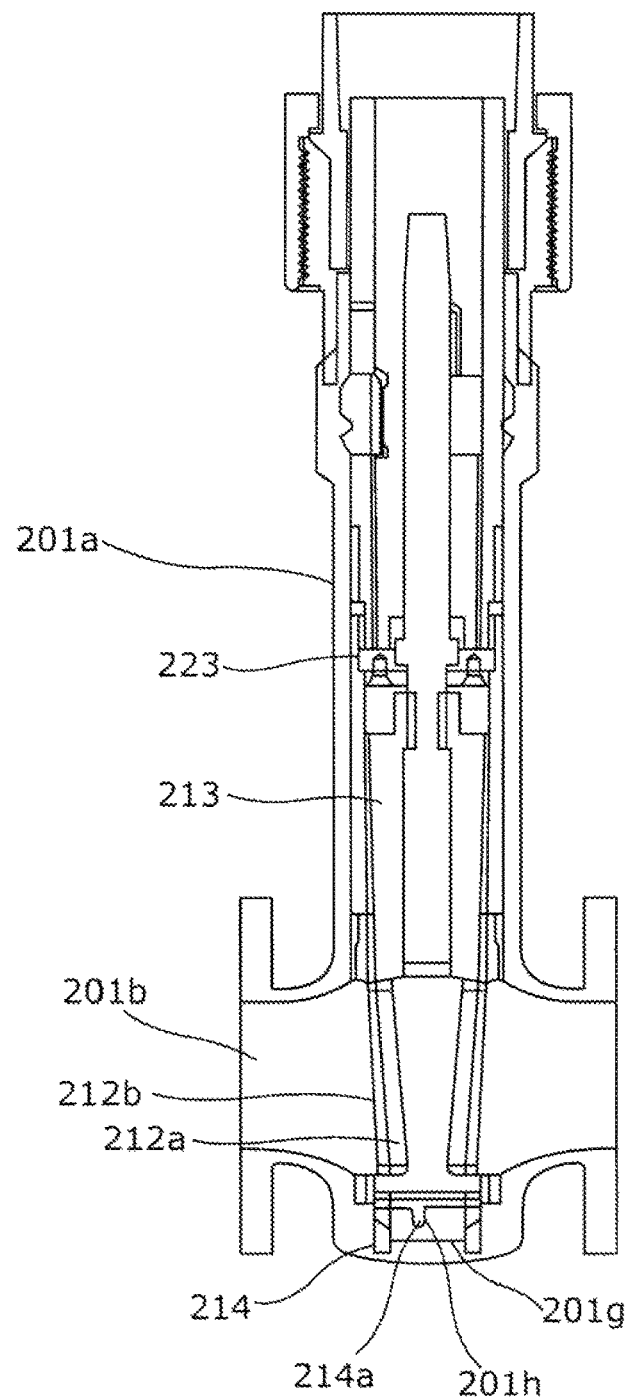
FIG. 14b is a schematic representation the apparatus illustrated in FIG. 14a with the valve open.
Figure 14C:
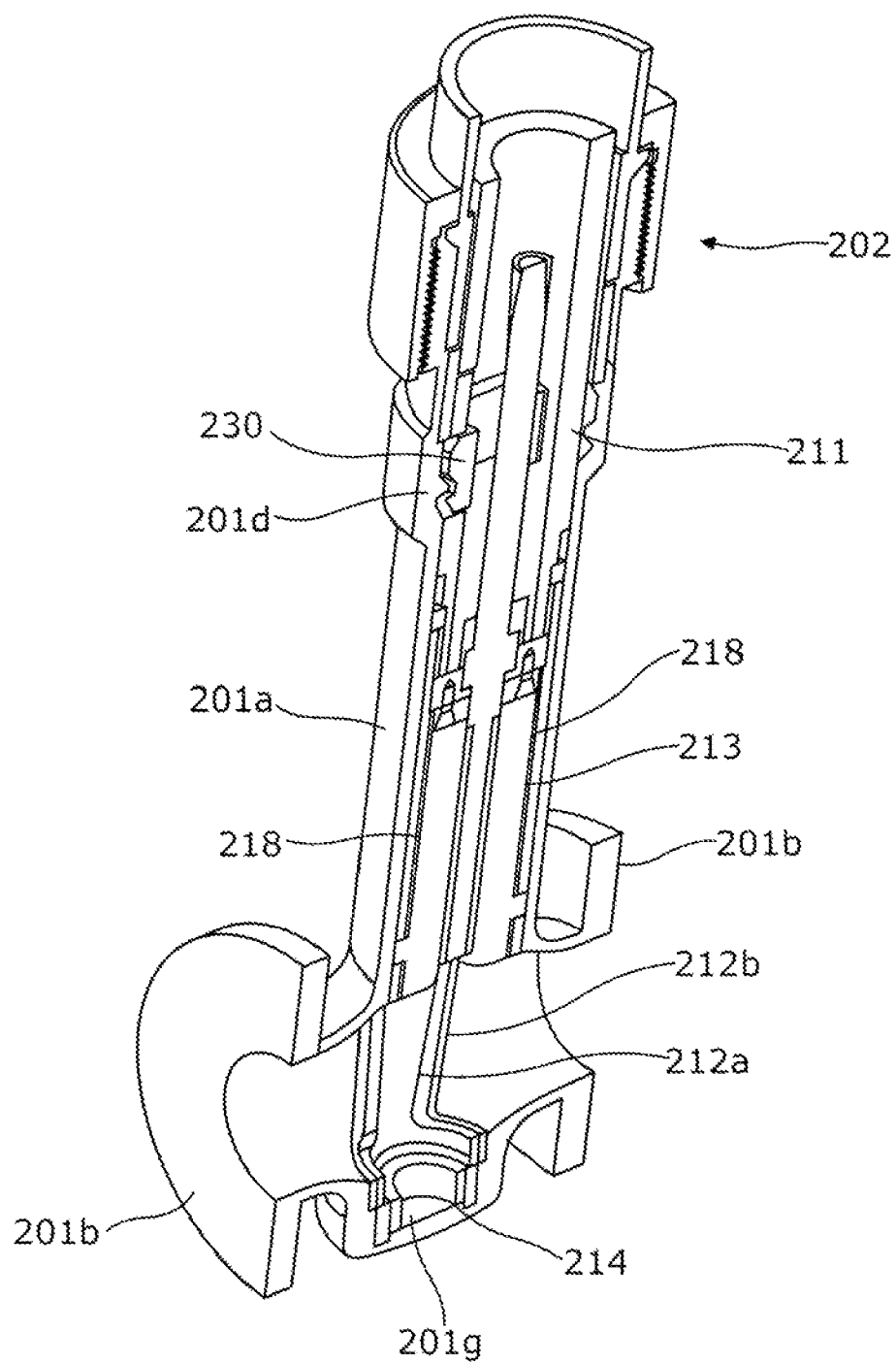
FIG. 14c is a cross-sectional schematic representation of the apparatus shown in FIG. 14b.
Figure 14D:
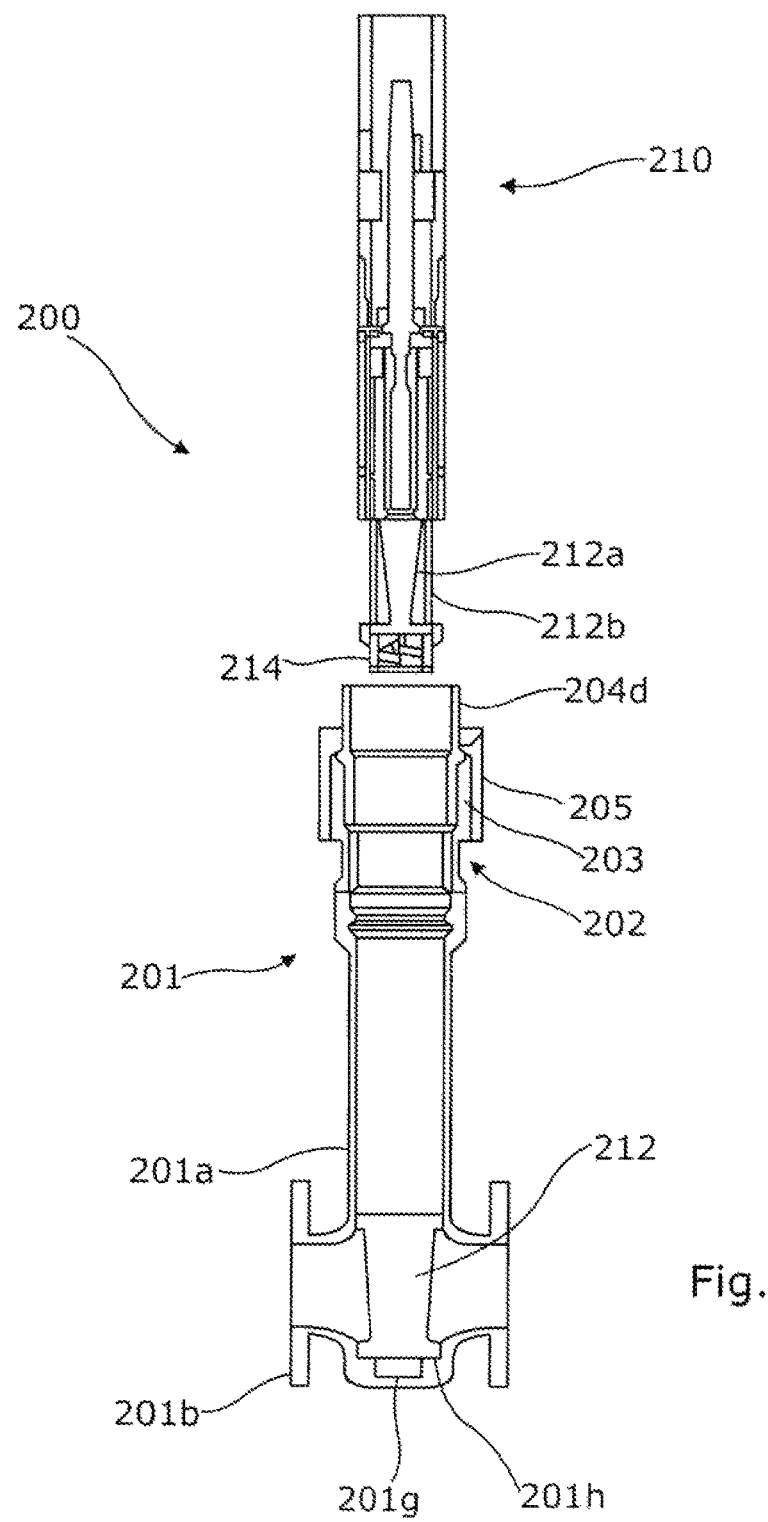
FIG. 14d is a cross-sectional schematic representation of the valve assembly extracted from the housing.

Referring specifically to FIG. 14d, the fluid control apparatus 200 is shown in with the valve assembly 210. The riser 201a of the housing 201 includes a part 201d towards its upper end, which forms part of a locking arrangement to lock the valve assembly 210 releasably in the housing 201. A collar 201e extends from the part 201d. The first of a three part collar assembly 202 is attached to the collar 201e. The first part 203 comprises a lower section 203b, which includes an internally threaded end 203c, providing for fastening of the first part 203 to the collar 201e, which includes an external threaded for engagement to the said internally threaded end. Fastening of first part 203 to the collar 201e is in the region 201f. As can be seen from FIG. 14a in particular, the collar 201c extends inside the first part 203 of the collar assembly 202. The first part 203 includes an upper section 203a, which is threaded externally.

The second part 204 of the three part collar assembly 202 includes a lower section 204a and an upper section 204d of different internal and external diameters. The lower section 204a sits within the first part 203. The upper and lower sections 204a, 204d are divided by a lip having a chamfered wall 204b which sits on a correspondingly chamfered wall 203d of part 203, and an upper wall 204c.

The third part 205 of the three part collar assembly 202 hold the second part 204 in place. Said third part 205 includes an internally threaded part 205a which engages external threads of the upper section 203a of the first part 203. The third part 205 includes an inwardly extending lip 205b which sits on the upper wall 204c of the second part 204. The third part 205 also includes a recess 205c for receiving a seal, such as an O-ring.

The valve assembly 210 comprises a mandrel 211 which is a sliding fit within the riser 201a and the collar assembly 202. The mandrel 211 mounts a part of a pop-out lock 230, which engages with the part 201d of the riser 201a. The mandrel 211 includes a bottom wall 215. The bottom wall 215 includes a hole through which a spindle 220 passes. Mounted in the mandrel 211 is a housing 223 in which the thrust collar 221 of a spindle 220 is mounted. The housing 223 is attached to the bottom wall 215 of the mandrel by fasteners 216.

The mandrel 211 includes a valve seat 212. The valve seat 212 is attached to the mandrel 211 by side plates 218. The valve seat 212 comprises an inner valve seat member 212a and an outer valve seat member 212b. The outer valve seat member 212a includes a recess 212a' for engaging a protrusion 218' in the side plates 218 and a protrusion 212a" for engaging a recess 218" of the side plate 218.

Figure 14E:
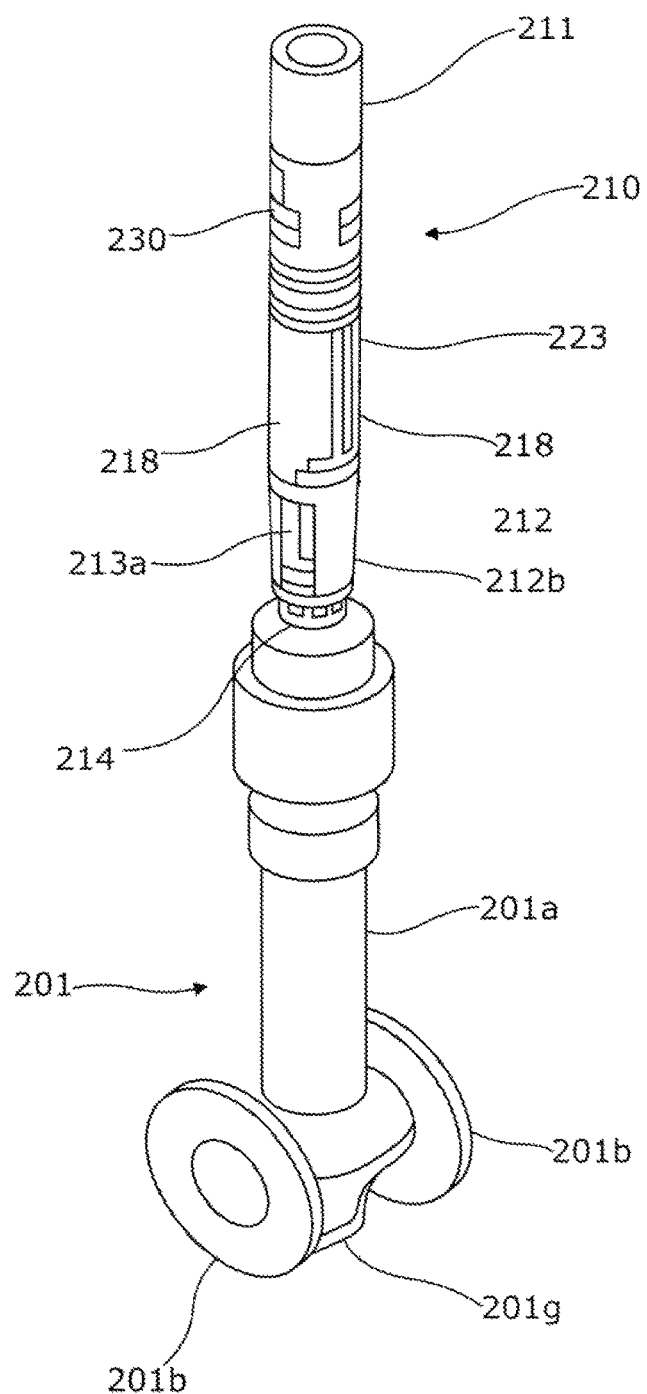
FIG. 14e is a schematic representation of the valve assembly shown in FIG. 14d.

FIG. 14e illustrates how the inner and outer valve seat members 212a, 212b provide an opening 213a, which is opened or closed by a valve member, such as a gate 213 is received in the valve seat 212. The gate 213 slides up and down in the inner valve seat member 212a. The outer valve seat member 212b engages inner surfaces of the housing 201 and provides a seal between the housing 201 and the valve seat 212. These sealing surfaces are out of the normal fluid flow path through the pipeline connector 201b of housing 201 and are therefore subject to less wear than would be the case for seals in the normal fluid flow path.

In the case of a gate valve as shown, to open the valve, the free end 222 of spindle 220 is engages with a tool (typically the free end 222 has a square head for engagement by a correspondingly shaped tool). The part of the spindle between the thrust collar 221 and the gate 213 is externally threaded and the gate 213 is internally threaded, so that depending on the direction of rotation of the spindle 220, the gate 213 is either raised or lowered. The housing 201 includes a sump 201g for receiving a collar 214 extending from the inner valve seat member 212a. The sump 201g includes an indent 201h, which receives a protrusion 214a. These two components act to prevent rotation of the valve in the housing.

The housing 223 provides a spindle seal 223a and a seal between the mandrel 211 and the riser 201a. A recess 224 is formed in the outer surface of the mandrel 211 and sealing elements, for example O-rings, are mounted on the mandrel in the recess 224 to provide the seal between the mandrel 211 and the inner surface of the riser 201.

The mandrel 211 shown is locked to the riser 201a by a pop-out lock, the operation of which is known to those skilled in the art. Alternatively, the mandrel may be locked in the riser 201a using a lock having the J-shaped slot arrangement described in relation to previously described embodiments. This arrangement is illustrated in FIGS. 15a to 15f.

The riser 201a includes J-shaped slots 301. A mandrel 300 includes a thrust bearing 302 supporting the thrust collar 221 of spindle 220. The mandrel 300 mounts a seal pack 309. The inner wall of the riser 201a is stepped providing regions 303 to 306 of sequentially differing diameter, the diameter of region 303 being smaller than that of region 304 and so on, thereby providing a step between each region. The step between regions 303 and 304 provides a bearing surface for one end of a spring 307. The other end of the spring engages the underside of the mandrel 300. The outer surface of the mandrel 300 is provided with pins 308 for engaging the J-shaped slots 301.

As is best seen from FIG. 15a, a seal pack 309 is supported on the underside of the mandrel 300, and has a diameter slightly smaller than the mandrel diameter. The external diameter of the seal pack 309 corresponds to the internal diameter of region 305 and the height of the seal pack 309 corresponds to the height of the region 305.

The seal pack provides a seal 310 about the spindle 220, which passes therethrough, and a seal 311 between the mandrel 300 between the inner surface of the riser 201a.

The mandrel 300 may be connected to the valve seat in the same or similar manner to that shown in FIGS. 14a to 14e.

Advantageously, some or all of the components are made of plastics materials. Typically, the springs would not be plastic.

There is no longer any need to dig up the road, saving huge amounts of time and labour. The deployment of the apparatus of the invention will allow pipeline leakage rates to be reduced significantly. Because of the simplicity of repairing the seal pack in the apparatus (failure in the seal pack is common), there is not the same need to schedule in the repair with other road works. If the apparatus must be accessed from the middle of a road, this can be done very quickly, bringing traffic disruption down to a sufficiently low level for the benefit of repair a leak to outweigh the cost of disrupting traffic.

The invention claimed is:

1. A pipeline apparatus comprising a housing including a riser and a pipeline connector, a valve seat mount, at least one valve seat, the at least one valve seat removable from the housing through the riser; characterised in that the apparatus further comprises locking means configured to lock the at least one valve seat in a position in the housing, wherein the locking means comprise elements mounted in the at least one valve seat, the elements each being slidably extendible from the valve seat into the housing to lock the at least one valve seat with respect to the housing and slidably retractable from the housing into the valve seat to unlock the at least one valve seat from the housing further comprising a valve, wherein the valve and valve seats are mounted in the pipeline connector and extend into the riser.

2. The pipeline apparatus according to claim 1, further comprising a shaft extending from the valve and through the housing and into a seal pack assembly in the riser.

3. The pipeline apparatus according to claim 2, comprising a landing nipple attachable to and extending the riser, the landing nipple having the seal pack assembly mounted therein.

4. The pipeline apparatus according to claim 1, the housing further comprising an extension attached releasably to the riser distal from the pipeline connector, and wherein a shaft extends from the valve and through the housing and into a seal pack assembly mounted in the riser.

5. A pipeline apparatus comprising a housing including a riser and a pipeline connector, a valve seat mount, at least one valve seat, the at least one valve seat removable from the housing through the riser; characterised in that the apparatus further comprises locking means configured to lock the at least one valve seat in a position in the housing, wherein the locking means comprise elements mounted in the at least one valve seat, the elements each being slidably extendible from the valve seat into the housing to lock the at least one valve seat with respect to the housing and slidably retractable from the housing into the valve seat to unlock the at least one valve seat from the housing, wherein the locking means includes one from the group comprising: a rack and pinion; and a lever mechanism.

6. The pipeline apparatus according to claim 5, wherein the elements are elongated elements mounted in channels in the valve seat.

* * * * *